(12) United States Patent
Ain-Kedem et al.

(10) Patent No.: US 11,163,154 B2
(45) Date of Patent: Nov. 2, 2021

(54) MULTI-POLYGON, VERTICALLY-SEPARATED LASER SCANNING APPARATUS AND METHODS

(71) Applicant: Intel Corporation, Santa Clara, CA (US)

(72) Inventors: Liron Ain-Kedem, Kiryat Tivon (IL); Arnon Hirshberg, D.N misgav (IL)

(73) Assignee: INTEL CORPORATION, Santa Clara, CA (US)

( * ) Notice: Subject to any disclaimer, the term of this patent is extended or adjusted under 35 U.S.C. 154(b) by 133 days.

(21) Appl. No.: 16/673,488

(22) Filed: Nov. 4, 2019

(65) Prior Publication Data

US 2020/0064623 A1    Feb. 27, 2020

(51) Int. Cl.
*G02B 26/12* (2006.01)
*G03G 15/04* (2006.01)

(52) U.S. Cl.
CPC ......... *G02B 26/121* (2013.01); *G02B 26/127* (2013.01); *G03G 15/04036* (2013.01)

(58) Field of Classification Search
CPC .............. G03G 15/04036; G02B 26/12; G02B 26/121; G02B 26/123; G02B 26/127
See application file for complete search history.

(56) References Cited

U.S. PATENT DOCUMENTS

| | | | |
|---|---|---|---|
| 2011/0228032 A1* | 9/2011 | Ohmiya | G02B 26/123 347/224 |
| 2012/0236381 A1* | 9/2012 | Oikawa | B41J 2/473 359/205.1 |
| 2017/0003501 A1* | 1/2017 | Yuasa | G02B 26/123 |
| 2019/0004448 A1* | 1/2019 | Nakano | G03G 15/04036 |
| 2019/0146371 A1* | 5/2019 | Yuasa | G03G 15/04036 399/216 |
| 2019/0151944 A1* | 5/2019 | Steffas | G02B 26/12 |
| 2019/0310469 A1* | 10/2019 | Sapir | G02B 26/124 |

* cited by examiner

*Primary Examiner* — Sophia S Chen
(74) *Attorney, Agent, or Firm* — Hanley, Flight & Zimmerman, LLC

(57) ABSTRACT

Multi-polygon, vertically-separated laser scanning apparatus and methods are disclosed. An example apparatus includes a multi-polygon. The multi-polygon includes a first polygon, a central axis, and a second polygon. The first polygon includes a first plurality of outwardly-facing mirrored facets. The second polygon includes a second plurality of outwardly-facing mirrored facets angularly offset about the central axis relative to the first plurality of outwardly-facing mirrored facets. The second polygon is positioned relative to the first polygon along the central axis. The first and second polygons are rotatable about the central axis.

27 Claims, 12 Drawing Sheets

MULTI-POLYGON, VERTICALLY-SEPARATED LASER SCANNING APPARATUS AND METHODS

FIELD OF THE DISCLOSURE

This disclosure relates generally to laser scanning apparatus and methods and, more specifically, to multi-polygon, vertically-separated laser scanning apparatus and methods.

BACKGROUND

Laser scanning applications are implemented in a variety of laser-based apparatus and/or systems including, for example, light detection and ranging (LiDAR) devices, barcode readers, laser projectors, laser cutters, 3D printers, etc. Known laser scanning systems commonly implement a single polygon to generate a scanning pattern (e.g., a scanning waveform). The polygon includes a hub and a number (e.g., 5, 6, 8, etc.) of outwardly-facing mirrored facets (e.g., sides) arranged about the hub. The hub of the polygon is mechanically coupled to a motor, and the motor is operatively coupled to (e.g., in electrical communication with) a controller. The motor rotates the polygon at a uniform desired speed in response to one or more control signal(s) received from the controller.

As the polygon rotates, light emitted by a pulsed laser and directed toward the polygon reflects off of the rotating outwardly-facing mirrored facets of the polygon in a saw-tooth pattern (e.g., a saw-tooth waveform). Assuming a horizontal orientation of the polygon, as is typically the case, the shape of the polygon and/or the resultant saw-tooth pattern impart horizontal separation to the scanning process. The saw-tooth scanning pattern generated by the polygon is generally preferable over other types of scanning patterns (e.g., bi-directional scanning patterns) that may be generated by other types of laser scanning applications and/or systems that do not implement a polygon.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time or quantity of elements, but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Figure 1:
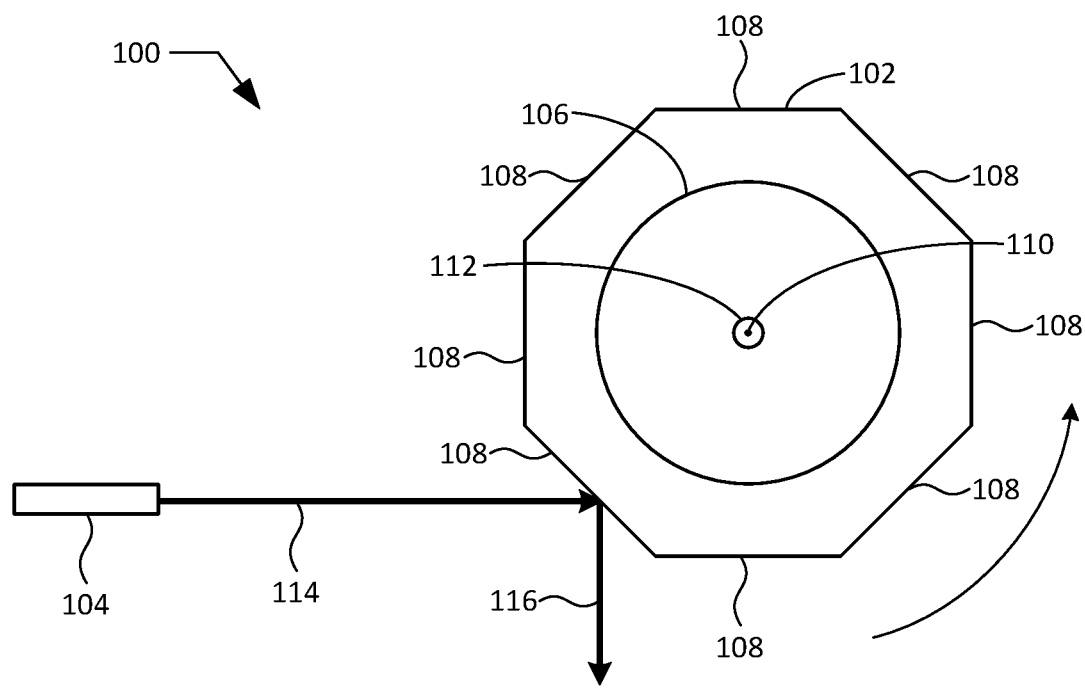
FIG. 1 is a top view of a known laser scanning apparatus.
Figure 2:
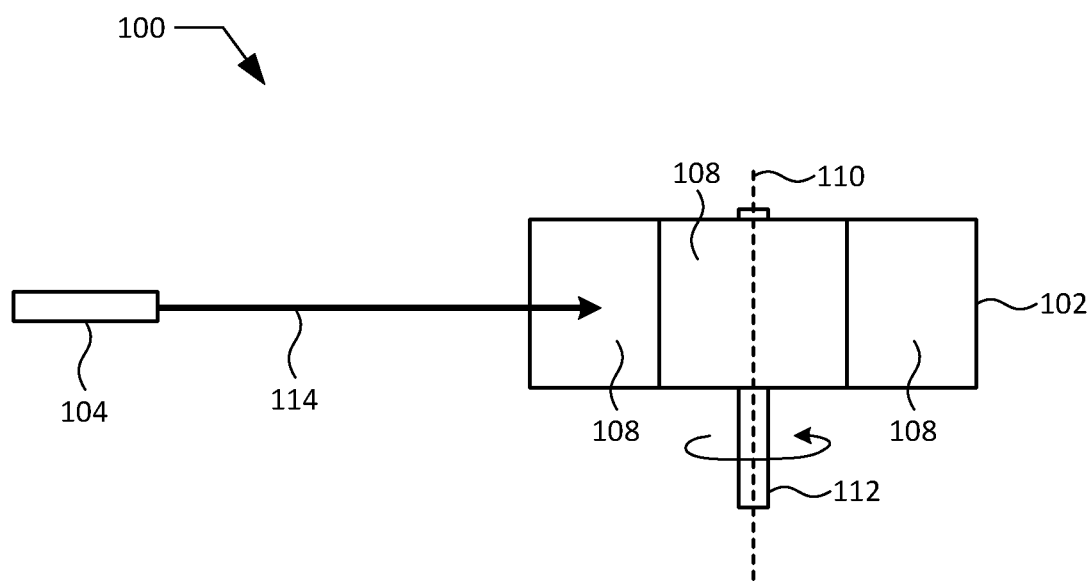
FIG. 2 is a side view of the known laser scanning apparatus of FIG. 1.

Known laser scanning systems commonly implement a single polygon to generate a scanning pattern (e.g., a scanning waveform). FIG. 1 is a top view of a known laser scanning apparatus 100. FIG. 2 is a side view of the known laser scanning apparatus 100 of FIG. 1. The known laser scanning apparatus of FIGS. 1 and 2 includes a polygon 102 and a light source 104. The polygon 102 includes a hub 106 and eight (8) outwardly-facing mirrored facets 108 arranged about the hub 106. The hub 106 defines a central axis 110 of the polygon 102. The hub 106 of the polygon is mechanically coupled (e.g., via a shaft 112) to a motor, and the motor is operatively coupled to (e.g., in electrical communication with) a controller. The light source 104 is a laser (e.g., a pulsed laser) that is configured (e.g., arranged and/or positioned) to emit a beam 114 of pulsed light in the direction of the polygon 102.

The motor rotates the polygon 102 at a uniform desired speed in response to one or more control signal(s) received from the controller. As the polygon 102 rotates, the beam 114 of pulsed light emitted by the light source 104 toward the polygon 102 reflects off of the rotating outwardly-facing mirrored facets 108 of the polygon 102 such that a reflected potion 116 of the beam 114 travels in a saw-tooth pattern (e.g., a saw-tooth waveform). Assuming a horizontal orientation of the polygon 102 (e.g., as shown in FIGS. 1 and 2), the shape of the polygon 102 and/or the resultant saw-tooth pattern impart horizontal separation to the scanning process.

The saw-tooth scanning pattern generated by the polygon 102 is generally preferable over other types of scanning patterns (e.g., bi-directional scanning patterns) that may be generated by other types of laser scanning systems that do not implement a polygon. This is particularly true for time-critical systems (e.g., autonomous vehicles including laser scanning systems) where minimal latency is important.

Figure 3:
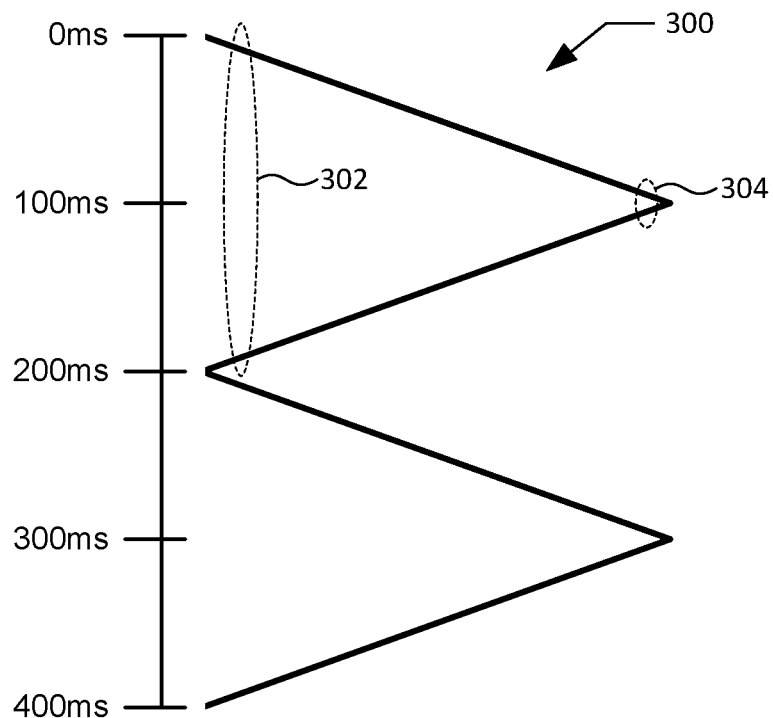
FIG. 3 illustrates a known bi-directional scanning pattern.

FIG. 3 illustrates a known bi-directional scanning pattern 300 of a laser scanning system that does not include a polygon. The frame refresh rate of the bi-directional scanning pattern 300 of FIG. 3 is not uniform. For example, as the bi-directional scanning pattern 300 of FIG. 3 progresses from left to right and back to the left, the frame refresh rate of a successive frame is opposite the frame refresh rate of the former frame. Thus, in a laser scanning system operating at ten frames-per-second (10 FPS) (e.g., as shown in FIG. 3), which equates to one hundred milliseconds (100 ms) per scan, the frame refresh rate is nearly two hundred milliseconds (200 ms) between successive scans on one side (e.g., the left side) of the bi-directional scanning pattern 300 (e.g., as shown by first duration 302 of FIG. 3), while the frame refresh rate is nearly zero milliseconds (0 ms) between successive scans on the opposite side (e.g., the right side) of the bi-directional scanning pattern 300 (e.g., as shown by second duration 304 of FIG. 3).

Figure 4:
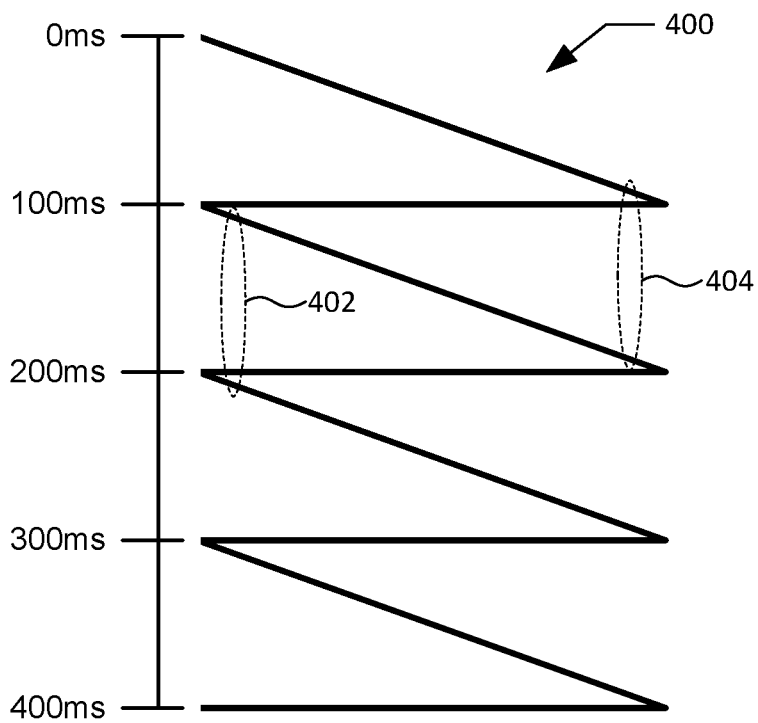
FIG. 4 illustrates a known saw-tooth scanning pattern.

FIG. 4 illustrates a known saw-tooth scanning pattern 400 of a laser scanning system that includes a polygon. In contrast to the bi-directional scanning pattern 300 of FIG. 3 described above, the saw-tooth scanning pattern 400 of FIG. 4 advantageously has a uniform frame refresh rate. For example, as the saw-tooth scanning pattern 400 of FIG. 4 progresses from left to right and back, the frame refresh rate of a successive frame is constant relative to the frame refresh rate of the former frame. Thus, in a laser scanning system operating at ten frames-per-second (10 FPS) (e.g., as shown in FIG. 4), which equates to one hundred milliseconds (100 ms) per scan, the frame refresh rate is uniformly one hundred milliseconds (100 ms) between successive scans on each side (e.g., the left side and the right side) of the saw-tooth scanning pattern 400 (e.g., as shown by first duration 402 and second reference duration 404 of FIG. 4). The uniform refresh rate of the saw-tooth scanning pattern 400 of FIG. 4 is highly desirable for real-time and/or time-critical systems that implement laser scanning.

While polygon-based laser scanning systems such as the known laser scanning system of FIGS. 1 and 2 described above are advantageous due to their ability to generate and/or implement a saw-tooth scanning pattern such as the saw-tooth scanning pattern 400 of FIG. 4 described above, existing polygon-based laser scanning systems have several shortcomings. For example, the scanning efficiency of existing polygon-based laser scanning systems is generally a function of the diameter of the beam of light emitted by the light source (e.g., a beam size and/or spot size associated with a beam of light emitted from a pulsed laser) and the lengths of the outwardly-facing mirrored facets of the polygon. Increasing the diameter of the beam of emitted light (e.g., by implementing a relatively larger diameter light source) negatively impacts the scanning efficiency unless the lengths of the outwardly-facing mirrored facets of the polygon are also increased to compensate for the increased diameter of the beam of emitted light. However, increasing the lengths of the outwardly-facing mirrored facets also increases the overall size of the polygon, which may be disadvantageous in implementations where the available space for the polygon and/or, more generally, the available space for the polygon-based laser scanning system, is small.

Size considerations of the polygon are of particular importance in implementations where the polygon-based laser scanning system is to have a relatively small field of view. For existing polygon-based laser scanning systems, the field of view of the polygon-based laser scanning system is inversely proportional to the number of outwardly-facing mirrored facets of the polygon. Thus, systems that require a relatively smaller field of view must implement a polygon having a relatively larger number of outwardly-facing mirrored facets. Increasing the number of outwardly-facing mirrored facets of the polygon increases the overall size of the polygon, often to a point which is unacceptable relative to the space constraints of the polygon-based laser scanning system.

Figure 5:
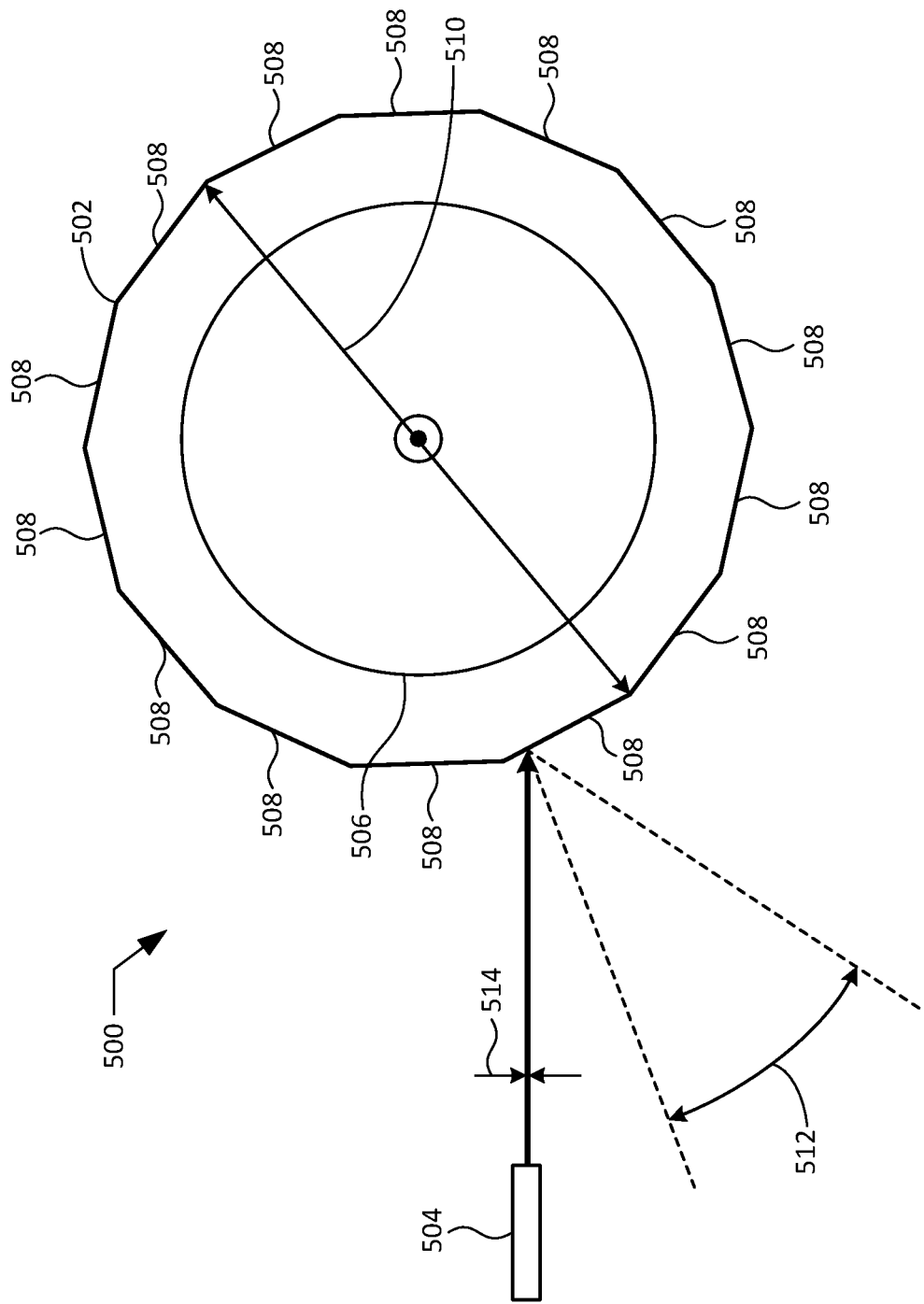
FIG. 5 is a top view of another known laser scanning apparatus.

For example, FIG. 5 is a top view of another known laser scanning apparatus 500. The known laser scanning apparatus 500 of FIG. 5 includes a polygon 502 and a light source 504. The polygon 502 includes a hub 506 and fourteen (14) outwardly-facing mirrored facets 508 arranged about the hub 506. As generally shown in FIG. 5, the polygon 502 is required to have a diameter 510 of approximately two hundred six millimeters (206 mm) to provide a thirty-six degree (36°) field of view 512 and a ninety-five percent (95%) scanning efficiency in connection with a pulsed light beam emitted by the light source 50, where the pulsed light beam has a beam diameter 514 of ten millimeters (10 mm). The polygon 502 of FIG. 5 is far too large for most commercial laser scanning implementations. While the size of the polygon 502 of FIG. 5 could conceivably be reduced by decreasing the lengths of the outwardly-facing mirrored facets 508, such a decrease would be at the expense of the above-described scanning efficiency, which would likewise be an unacceptable result for most commercial laser scanning implementations.

When a polygon-based scanning solution becomes unacceptably large due to a relatively small desired field of view, other scanning solutions (e.g., scanning solutions which are not polygon-based) must be considered. Known examples of such other scanning solutions include galvanometer-based scanning solutions that implement one or more galvanometer (commonly abbreviated as "galvo") steering mirror(s), and microelectromechanical-system-based scanning solutions that implement one or more microelectromechanical system (MEMS) steering mirror(s). Relative to existing polygon-based scanning solutions, however, such other scanning solutions are typically more expensive and more complicated to control. Furthermore, such other scanning solutions typically provide scanning patterns that are optically-slow relative to the optically-fast saw-tooth scanning patterns that are advantageously provided by polygon-based scanning solutions.

Unlike the conventional polygon-based laser scanning systems described above which respectively implement only a single polygon, example laser scanning apparatus and methods disclosed herein include a multi-polygon having a plurality of polygons (e.g., two or more polygons) that are rotationally offset relative to one another about a central axis of the multi-polygon, and stacked (e.g., positioned adjacent (in some examples, separated from) and/or in face-to-face contact with) relative to one another along the central axis of the multi-polygon. The rotationally-offset, stacked arrangement of the polygons included in example multi-polygons disclosed herein provides numerous advantages for example laser scanning apparatus disclosed herein relative to the capabilities and/or characteristics of conventional single-polygon laser scanning systems described above.

For example, by implementing a multi-polygon having a rotationally-offset, stacked arrangement of polygons, example laser scanning apparatus disclosed herein can advantageously be structured and/or configured to have a size (e.g. a diameter) associated with providing a desired field of view and a desired scanning efficiency that is substantially smaller and/or more compact relative to the size of the corresponding polygon component that would be required to provide the same desired field of view and the same desired scanning efficiency in a single-polygon implementation. Implementing a multi-polygon having a rotationally-offset, stacked arrangement of polygons advantageously enables example laser scanning apparatus and methods disclosed herein to achieve the aforementioned size-reduction benefit while maintaining the ability to provide (e.g., via the multi-polygon) an optically-fast, sawtooth scanning pattern.

In addition to implementing an example multi-polygon as disclosed herein, example laser scanning apparatus and methods disclosed herein further include a separator structured and/or configured to operate in sync with the multi-polygon to advantageously generate vertical separation with respect to pulses of light emitted toward and reflected off of respective ones of the polygons of the multi-polygon. For instance, example separators disclosed herein may cause pulses of light emitted from a light source at first times to be directed toward and reflect off of a first one of the polygons of an example multi-polygon disclosed herein, and may further cause pulses of light emitted from the light source at second times to be directed toward and reflect off of a second one of the polygons of the multi-polygon neighboring (e.g., stacked above or below) the first one of the polygons of the multi-polygon. Thus, example separators disclosed herein advantageously impart vertical separation to the scanning process in addition to the horizontal separations imparted by respective ones of the polygons of the multi-polygon.

Figure 6:
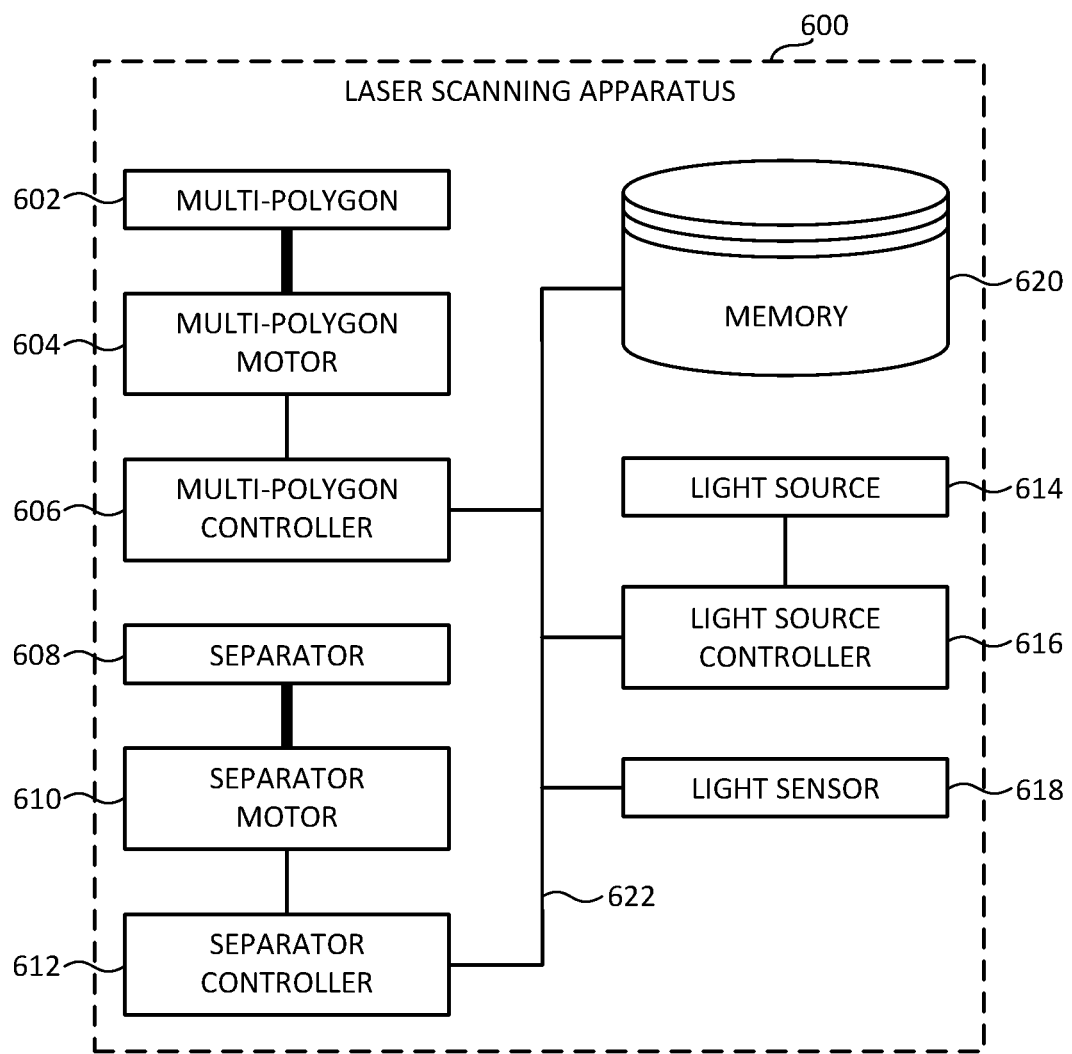
FIG. 6 is a block diagram of an example laser scanning apparatus constructed in accordance with teachings of this disclosure.

FIG. 6 is a block diagram of an example laser scanning apparatus 600 constructed in accordance with teachings of this disclosure. In the illustrated example of FIG. 6, the laser scanning apparatus 600 includes an example multi-polygon 602, an example multi-polygon motor 604, an example multi-polygon controller 606, an example separator 608, an example separator motor 610, an example separator controller 612, an example light source 614, an example light source controller 616, an example light sensor 618, and an example memory 620. However, other example implementations of the laser scanning apparatus 600 of FIG. 6 may include fewer or additional structures.

In the illustrated example of FIG. 6, the multi-polygon 602 is mechanically coupled to the multi-polygon motor 604, and the multi-polygon motor 604 is operatively coupled to (e.g., in electrical communication with such as via wired coupling) the multi-polygon controller 606. The separator 608 of FIG. 6 is mechanically coupled to the separator motor 610, and the separator motor 610 is operatively coupled to (e.g., in an electrical circuit with) the separator controller 612. The light source 614 of FIG. 6 is operatively coupled to the light source controller 616. The multi-polygon controller 606, the separator controller 612, the light source controller 616, the light sensor 618, and/or the memory 620 are in communication via an example communication bus 622. The multi-polygon controller 606, the separator controller 612, and/or the light source controller 616 of FIG. 6 may individually and/or collectively be implemented by any type(s) and/or any number(s) of semiconductor device(s) (e.g., microprocessor(s), microcontroller(s), etc.). In some examples, the multi-polygon motor 604 and the separator motor 610 may be implemented as the same motor.

The example multi-polygon 602 of FIG. 6 includes a plurality of polygons (e.g., two or more polygons) that are respectively stacked (e.g., positioned adjacent (in some examples, separated from) and/or in face-to-face contact with) relative to one another along a central axis of the multi-polygon 602. The polygons of the multi-polygon 602 of FIG. 6 respectively include outwardly-facing mirrored facets. Neighboring ones of the stacked polygons of the multi-polygon 602 of FIG. 6 are rotationally offset relative to one another about the central axis of the multi-polygon 602, and the outwardly-facing mirrored facets of neighboring ones of the stacked polygons are angularly offset relative to one another about the central axis of the multi-polygon 602. The multi-polygon 602 of FIG. 6 is rotatable about the central axis of the multi-polygon. The polygons of the multi-polygon 602 of FIG. 6 rotate in unison as the multi-polygon 602 rotates.

The multi-polygon 602 of FIG. 6 may be of any size, shape and/or configuration. For example, the multi-polygon 602 of FIG. 6 may include any number of polygons greater than or equal to two (2) polygons, and each polygon of the multi-polygon 602 may be of any size (e.g., any diameter) and/or may have any number of outwardly-facing mirrored facets. In some examples, the size and/or the number of outwardly-facing mirrored facets, and/or, more generally, the size of the multi-polygon 602 of FIG. 6 may be established and/or dictated by a desired field of view and/or a desired scanning efficiency associated with a scanning process and/or protocol to be implemented by the laser scanning apparatus 600 of FIG. 6. Example multi-polygons that may implement the multi-polygon 602 of the laser scanning apparatus 600 FIG. 6 are further described below in connection with FIGS. 7-9.

Figure 7:
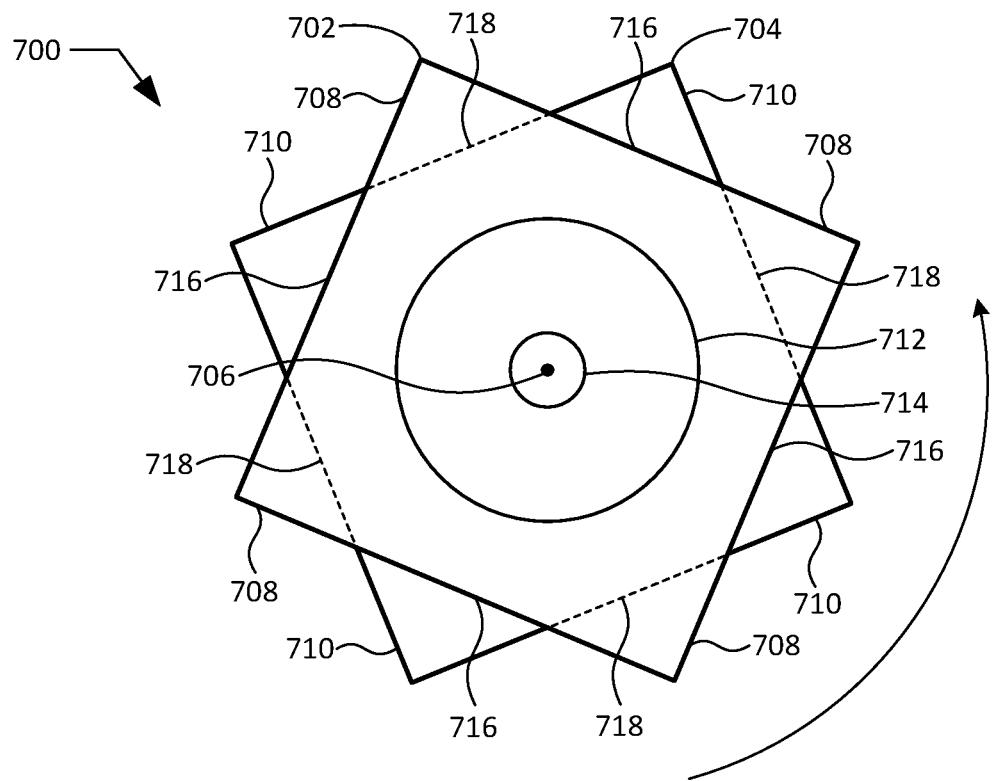
FIG. 7 is a top view of an example multi-polygon that may be implemented by the laser scanning apparatus of FIG. 6.
Figure 8:
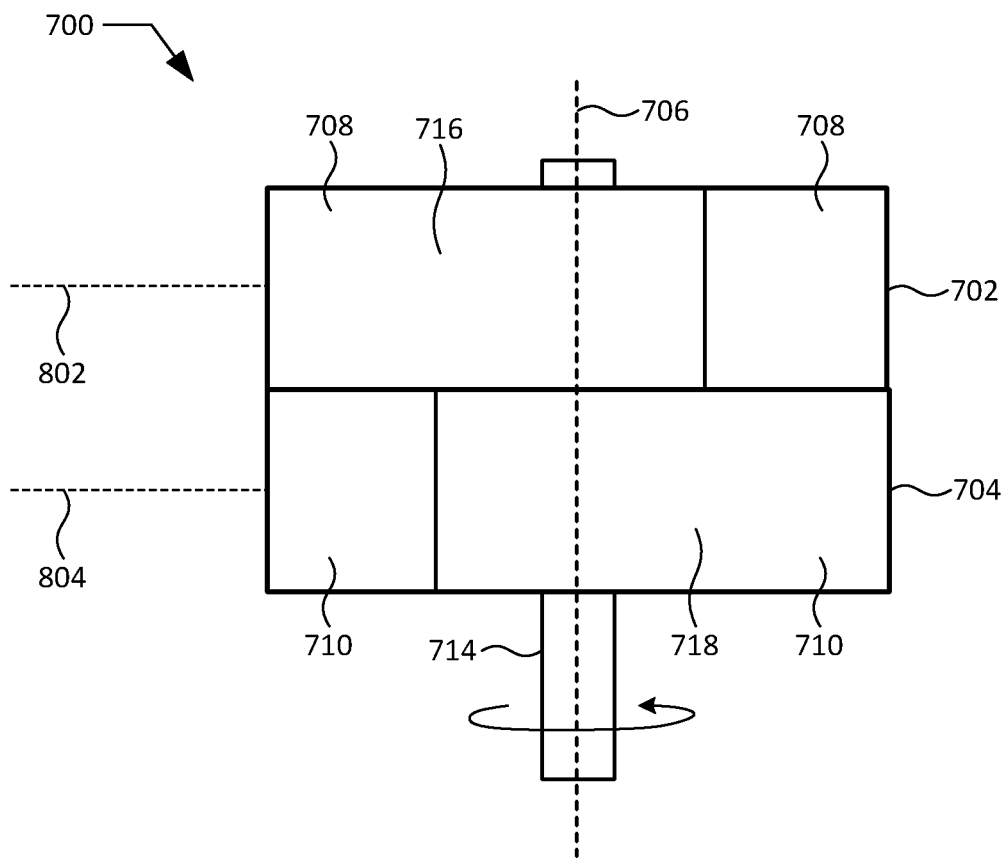
FIG. 8 is a side view of the multi-polygon of FIG. 7.

FIG. 7 is a top view of an example multi-polygon 700 that may be implemented by the laser scanning apparatus 600 of FIG. 6. FIG. 8 is a side view of the multi-polygon 700 of FIG. 7. The multi-polygon 700 of FIGS. 7 and 8 may implement the multi-polygon 602 of FIG. 6. In the illustrated example of FIGS. 7 and 8, the multi-polygon 700 includes an example first polygon 702, an example second polygon 704, and an example central axis 706. The first polygon 702 is stacked (e.g., positioned adjacent (in some examples, separated from) and/or in face-to-face contact with) relative to the second polygon 704 along the central axis 706. The first polygon 702 of FIGS. 7 and 8 includes example first outwardly-facing mirrored facets 708, and the second polygon 704 of FIGS. 7 and 8 includes example second outwardly-facing mirrored facets 710. In the illustrated example of FIGS. 7 and 8, the rotational position of the second polygon 704 about the central axis 706 is rotationally offset (e.g., by approximately forty-five degrees) from the rotational position of the first polygon 702 about the central axis 706. The second outwardly-facing mirrored facets 710 of the second polygon 704 are accordingly angularly offset (e.g., by approximately forty-five degrees) about the central axis 706 relative to the first outwardly-facing mirrored facets 708 of the first polygon 702.

In the illustrated example of FIGS. 7 and 8, the multi-polygon 700 further includes an example hub 712 that defines the central axis 706 of the multi-polygon 700. The first outwardly-facing mirrored facets 708 of the first polygon 702 are arranged about the hub 712, as are the second outwardly-facing mirrored facets 710 of the second polygon 704. In the illustrated example of FIGS. 7 and 8, the hub 712 of the multi-polygon 700 is mechanically coupled (e.g., fixedly coupled) to an example shaft 714. The shaft 714 may be mechanically coupled to a motor (e.g., the multi-polygon motor 604 of FIG. 6) that is structured and/or configured to rotate the shaft 714 about the central axis 706. As the shaft 714 rotates, the hub 712 and/or, more generally, the multi-polygon 700 of FIGS. 7 and 8 rotates about the central axis 706. The first polygon 702 and the second polygon 704 of this example rotate in unison with one another (e.g., as a fixed unit) as the multi-polygon 700 rotates.

The stacked and rotationally offset relationship between the first polygon 702 and the second polygon 704 results in the formation of effective facets. As used herein, the term "effective facet" means an area, portion, and/or section of a facet of a polygon onto which light (e.g., generated by a light source) is to be directed and/or projected. In the illustrate example of FIGS. 7 and 8, the first polygon 702 of the multi-polygon 700 includes example first effective facets 716 defined by portions of the first outwardly-facing mirrored facets 708 that are overlapped by portions of the second outwardly-facing mirrored facets 710. Similarly, the second polygon 704 of the multi-polygon 700 includes example second effective facets 718 defined by portions of the second outwardly-facing mirrored facets 710 that are overlapped by portions of the first outwardly-facing mirrored facets 708. As shown in FIG. 7, the second effective facets 718 of the second polygon 704 are evenly and/or symmetrically circumferentially interleaved with the first effective facets 716 of the first polygon 702 about the central axis 706.

The multi-polygon 700 of FIGS. 7 and 8 is structured and/or configured to reflect first pulses of light received at the first effective facets 716 of the first polygon 702 as the multi-polygon 700 rotates about the central axis 706. The polygonal shape of the first polygon 702 of FIGS. 7 and 8 causes the multi-polygon 700 to separate the first reflected pulses of light from one another along an example first plane 802 as the multi-polygon 700 rotates about the central axis 706. The multi-polygon 700 of FIGS. 7 and 8 is further structured and/or configured to reflect second pulses of light received at the second effective facets 718 of the second polygon 704 as the multi-polygon 700 rotates about the central axis 706. The polygonal shape of the second polygon 704 of FIGS. 7 and 8 causes the multi-polygon 700 to separate the second reflected pulses of light from one another along an example second plane 804 as the multi-polygon 700 rotates about the central axis 706. In some examples, the second plane 804 is parallel to and separated by a distance from the first plane 802. For example, as shown in FIG. 8, the central axis 706 of the multi-polygon 700 is vertically oriented, the first plane 802 is horizontally oriented, the second plane 804 is horizontally oriented, and the second plane 804 is vertically separated from the first plane 802 by a distance. Thus, the multi-polygon 700 of FIGS. 7 and 8 provides and/or generates, via the first effective facets 716 of the first polygon 702 and the second effective facets 718 of the second polygon 704, a pattern of horizontally-separated and vertically-separated reflected pulses of light.

In the illustrated example of FIGS. 7 and 8, the multi-polygon 700 includes only two polygons (e.g., the first polygon 702 and the second polygons 704). In other examples, the multi-polygon 700 of FIGS. 7 and 8 may include more than two (e.g., 3, 4, 5, etc.) polygons. In the illustrated example of FIGS. 7 and 8, the first polygon 702 and the second polygon 704 of the multi-polygon 700 have the same size, and the second polygon 704 includes the same number of second outwardly-facing mirrored facets 710 as the number of first outwardly-facing mirrored facets 708 included in the first polygon 702. In other examples, the size of the second polygon 704 of the multi-polygon 700 may differ form the size of the first polygon 702 of the multi-polygon 700, and/or the second polygon 704 may have a number of second outwardly-facing mirrored facets 710 that differs from the number of first outwardly-facing mirrored facets 708 of the first polygon 702. In the illustrated example of FIGS. 7 and 8, the first polygon 702 and the second polygon 704 of the multi-polygon 700 respectively include four (4) outwardly-facing mirrored facets (e.g., the first outwardly-facing mirrored facets 708 of the first polygon 702 and the second outwardly-facing mirrored facets 710 of the second polygon 704). In other examples, the first polygon 702 and the second polygon 704 of the multi-polygon may respectively have more than four (e.g., 5, 6, 8, 12, 24, etc.) outwardly-facing mirrored facets.

Figure 9:
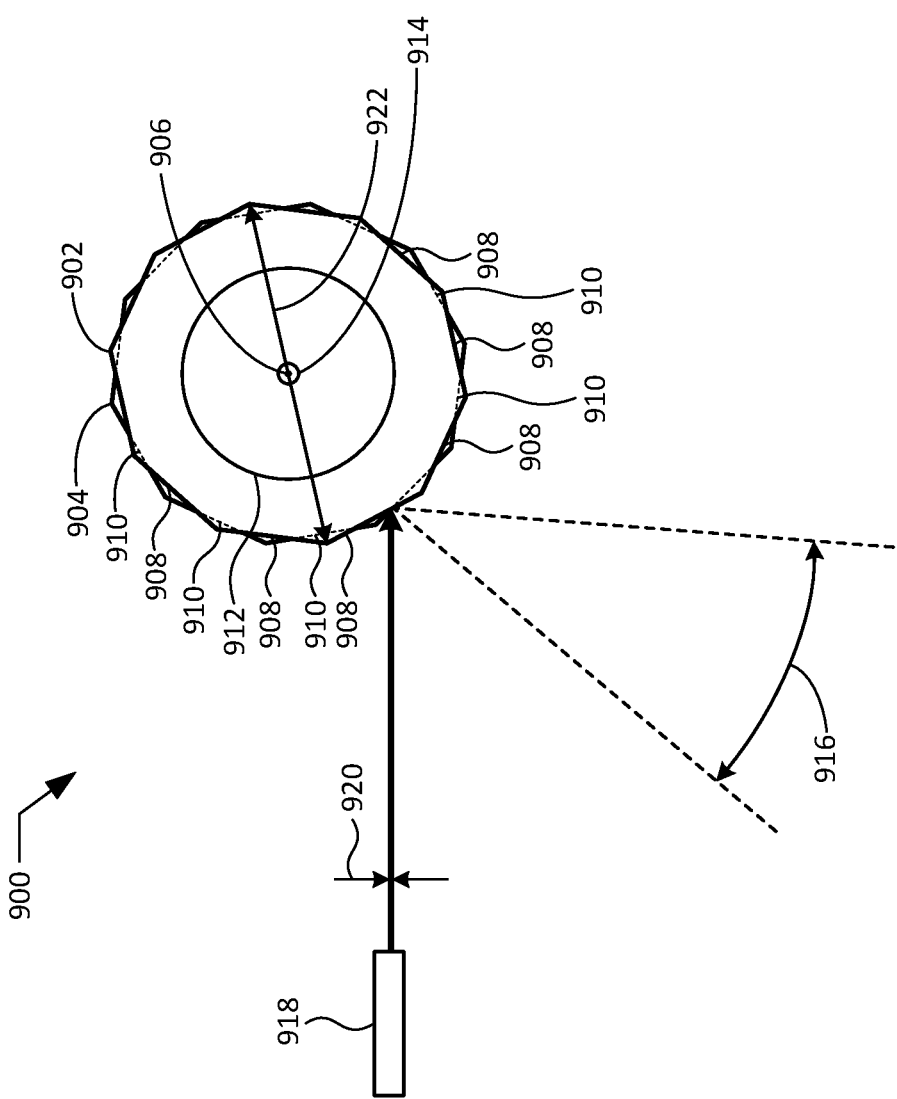
FIG. 9 is a top view of another example multi-polygon that may be implemented by the laser scanning apparatus of FIG. 6.

FIG. 9 is a top view of another example multi-polygon 900 that may be implemented by the laser scanning apparatus 600 of FIG. 6. The multi-polygon 900 of FIG. 9 may implement the multi-polygon 602 of FIG. 6. In the illustrated example of FIG. 9, the multi-polygon 900 includes an example first polygon 902, an example second polygon 904, and an example central axis 906. The first polygon 902 is stacked (e.g., positioned adjacent (in some examples, separated from) and/or in face-to-face contact with) relative to the second polygon 904 along the central axis 906. The first polygon 902 of FIG. 9 includes ten (10) example first outwardly-facing mirrored facets 908, and the second polygon 904 of FIG. 9 includes ten (10) example second outwardly-facing mirrored facets 910. In the illustrated example of FIG. 9, the rotational position of the second polygon 904 about the central axis 906 is rotationally offset from the rotational position of the first polygon 902 about the central axis 906. The second outwardly-facing mirrored facets 910 of the second polygon 904 are accordingly angularly offset about the central axis 906 relative to the first outwardly-facing mirrored facets 908 of the first polygon 902 in an evenly-spaced and/or symmetrical arrangement.

In the illustrated example of FIG. 9, the multi-polygon 900 further includes an example hub 912 that defines the central axis 906 of the multi-polygon 900. The first outwardly-facing mirrored facets 908 of the first polygon 902 are arranged about the hub 912, as are the second outwardly-facing mirrored facets 910 of the second polygon 904. In the illustrated example of FIG. 9, the hub 912 of the multi-polygon 900 is mechanically coupled (e.g., fixedly coupled) to an example shaft 914. The shaft 914 may be mechanically coupled to a motor (e.g., the multi-polygon motor 604 of FIG. 6) that is structured and/or configured to rotate the shaft 914 about the central axis 906. As the shaft 914 rotates, the hub 912 and/or, more generally, the multi-polygon 900 of FIG. 9 rotates about the central axis 906. The first polygon 902 and the second polygon 904 of this example rotate in unison with one another (e.g., as a fixed unit) as the multi-polygon 900 rotates.

Like the single polygon 502 of the known laser scanning apparatus 500 described above, the multi-polygon 900 of FIG. 8 is structured and/or configured to provide a thirty-six degree (36°) field of view 916 and a ninety-five percent (95%) scanning efficiency in connection with a pulsed light beam emitted by an example light source 918, where the pulsed light beam has an example beam diameter 920 of ten millimeters (10 mm). The size of the multi-polygon 900 of FIG. 9, however, is substantially smaller and/or more compact relative to the size of the polygon 502 of FIG. 5. For example, while the polygon 502 of FIG. 5 has a diameter 510 of approximately two hundred six millimeters (206 mm), the multi-polygon 900 of FIG. 9 has an example diameter 922 of approximately ninety millimeters (90 mm).

Returning to the illustrated example of FIG. 6, the example multi-polygon motor 604 of FIG. 6 is mechanically coupled (e.g., via one or more fastener(s), connector(s), shaft(s), rod(s), link(s), gear(s), etc.) to the multi-polygon 602 of FIG. 6. The multi-polygon motor 604 rotates the multi-polygon 602 about the central axis of the multi-polygon 602 (e.g., at a uniform speed) in response to one or more control signal(s) received from the multi-polygon controller 606 of FIG. 6. The multi-polygon motor 604 of FIG. 6 may be implemented by one or more electromechanical motor(s) of any type(s), including for example, one or more servo motor(s), one or more galvo motor(s), etc.

The example multi-polygon controller 606 of FIG. 6 is operatively coupled to (e.g., in a circuit with) the multi-polygon motor 604 of FIG. 6. The multi-polygon controller 606 of FIG. 6 commands the multi-polygon motor 604 of FIG. 6 to rotate the multi-polygon 602 of FIG. 6 at a defined speed. For example, the multi-polygon controller 606 of FIG. 6 may generate one or more control signal(s) that, when received by the multi-polygon motor 604 of FIG. 6, cause the multi-polygon motor 604 to rotate the multi-polygon 602 of FIG. 6 at a corresponding (e.g., a uniform) speed. In some examples, the speed at which the multi-polygon 602 rotates may be variable, and/or may correspond to and/or be based on the content of the control signal(s) generated by the multi-polygon controller 606 of FIG. 6.

In some examples, the multi-polygon controller 606 of FIG. 6 may command the multi-polygon motor 604 of FIG. 6 to rotate the multi-polygon 602 of FIG. 6 in response to one or more laser scanning initiation command(s), signal(s), and/or instructions(s) received by and/or at the multi-polygon controller 606, and/or, more generally, received by and/or at the laser scanning apparatus 600 of FIG. 6. In some examples, the multi-polygon controller 606 of FIG. 6 may command the multi-polygon motor 604 of FIG. 6 to cease rotating the multi-polygon 602 of FIG. 6 in response to one or more laser scanning termination command(s), signal(s), and/or instructions(s) received by and/or at the multi-polygon controller 606, and/or, more generally, received by and/or at the laser scanning apparatus 600 of FIG. 6.

The example separator 608 of FIG. 6 cyclically directs pulsed light received at the separator 608 from the light source 614 of FIG. 6 to alternating ones of the circumferentially interleaved effective facets of the polygons of the multi-polygon 602 of FIG. 6 as the multi-polygon 602 rotates. In some examples, the separator 608 of FIG. 6 moves in sync with the rotation of the multi-polygon 602 of FIG. 6. As used herein in the context of describing movement of a separator (e.g., the separator 608 of FIG. 6) relative to rotation of a multi-polygon (e.g., the multi-polygon 602 of FIG. 6), the term "in sync" or "in synchronicity" means that the movement of the separator occurs during the rotation of the multi-polygon, and that the movement of the separator occurs at a cyclic speed, frequency, and/or rate that equals, that is a multiple of, or that otherwise correlates to a cyclic speed, frequency, and/or rate at which the multi-polygon rotates. For example, a separator may move in sync with a rotating multi-polygon when the movement of the separator occurs during the rotation of the multi-polygon and at a cyclic speed, frequency, and/or rate that equals that of the rotation of the multi-polygon. As another example, a separator may move in sync with a rotating multi-polygon when the movement of the separator occurs during the rotation of the multi-polygon and at a cyclic speed, frequency, and/or rate that is four (4) times that of the rotation of the multi-polygon. Example separators that may be implemented the separator 608 of the laser scanning apparatus 600 FIG. 6 are further described below in connection with FIGS. 10-17.

Figure 10:
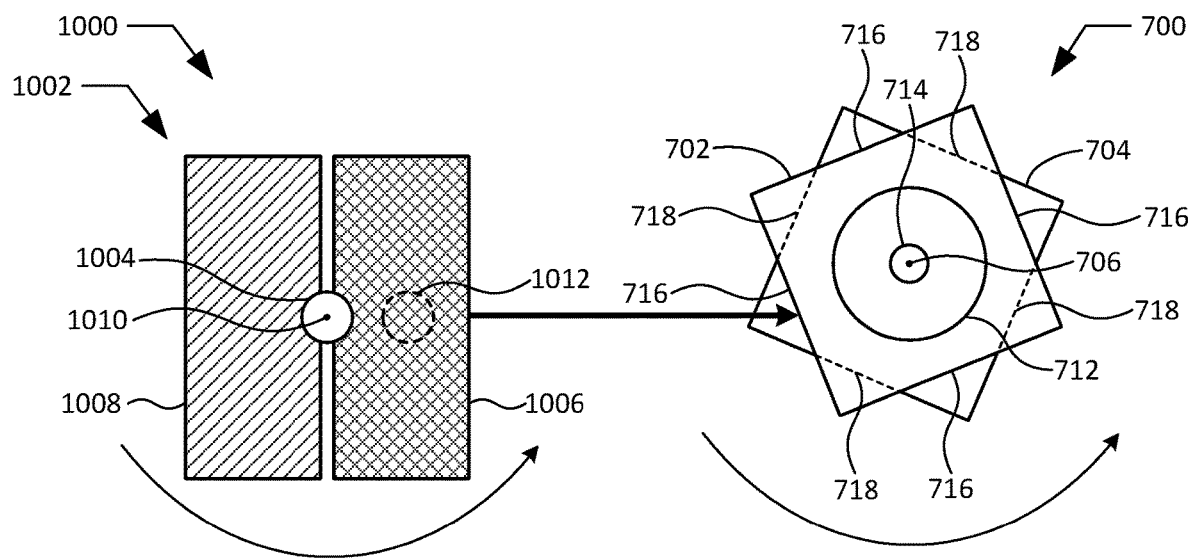
FIG. 10 is a top view of a first example separator that may be implemented by the laser scanning apparatus of FIG. 6, with the separator shown in a first example position.
Figure 11:
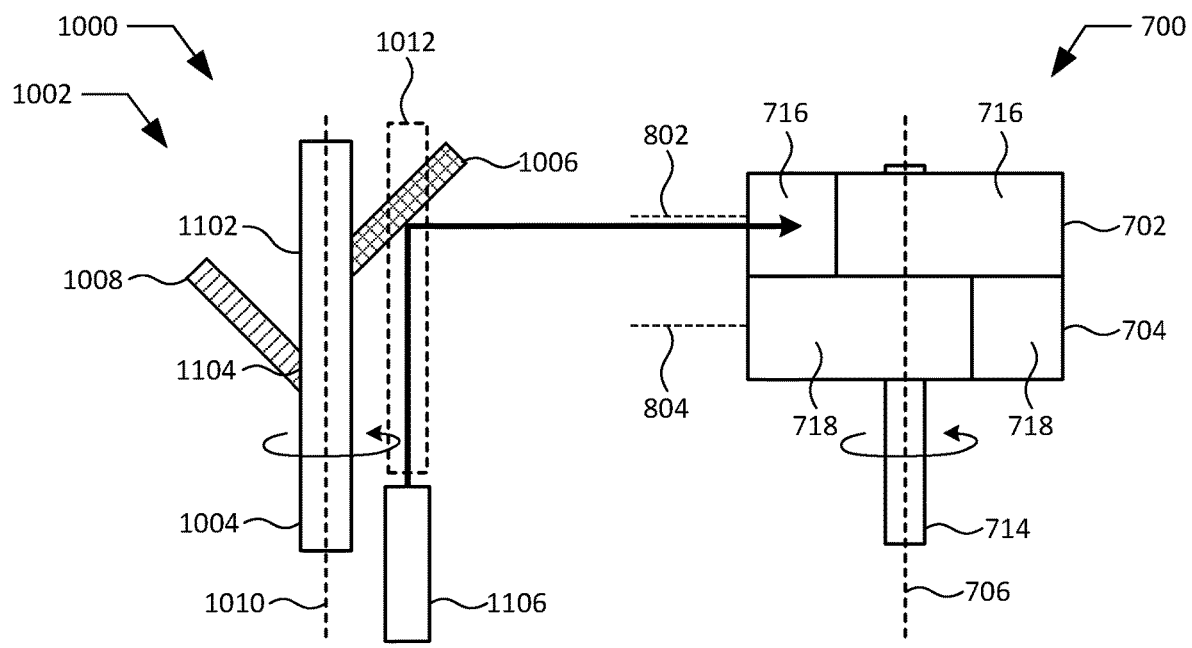
FIG. 11 is a side view of the separator of FIG. 10, with the separator shown in the first position of FIG. 10.
Figure 12:
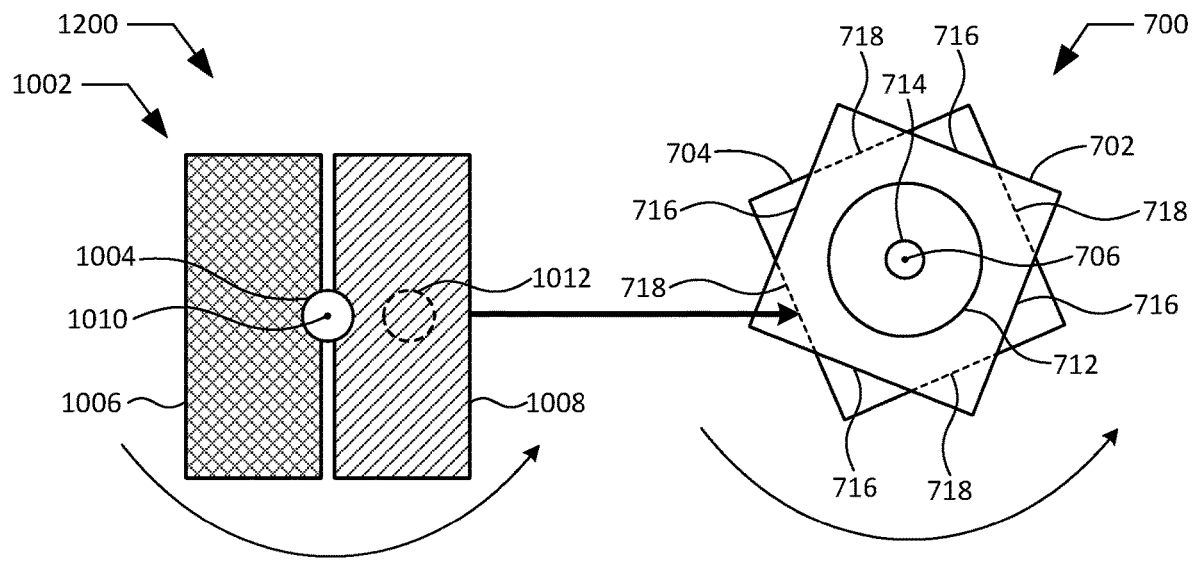
FIG. 12 is a top view of the separator of FIGS. 10 and 11, with the separator shown in a second example position.
Figure 13:
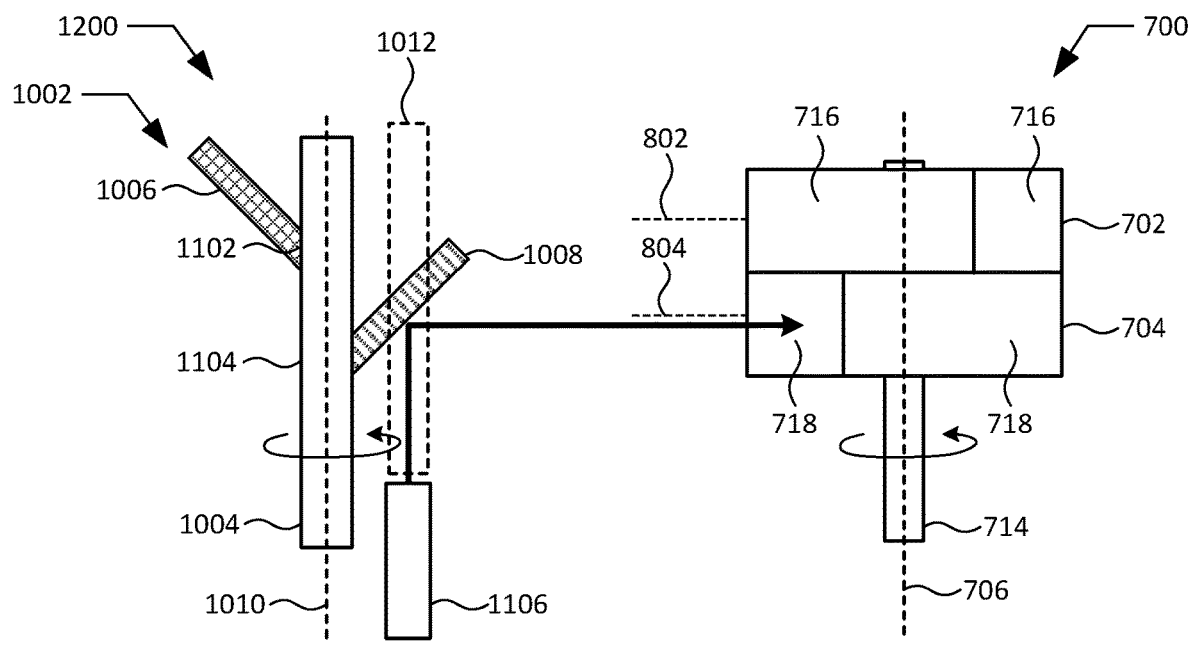
FIG. 13 is a side view of the separator of FIGS. 10-12, with the separator shown in the second position of FIG. 12.

FIG. 10 is a top view of a first example separator 1002 that may be implemented by the laser scanning apparatus 600 of FIG. 6, with the separator 1002 shown in a first example position 1000. FIG. 11 is a side view of the separator 1002 of FIG. 10, with the separator 1002 shown in the first position 1000 of FIG. 10. FIG. 12 is a top view of the separator 1002 of FIGS. 10 and 11, with the separator 1002 shown in a second example position 1200. FIG. 13 is a side view of the separator 1002 of FIGS. 10-12, with the separator 1002 shown in the second position 1200 of FIG. 12. The separator 1002 of FIGS. 10-13 may implement the separator 608 of FIG. 6. In the illustrated example of FIGS. 10-13, the separator 1002 is shown implemented in conjunction with the multi-polygon 700 of FIGS. 7 and 8 described above. In other examples, the separator 1002 of FIGS. 10-13 may alternatively be implemented with a multi-polygon other than the multi-polygon 700 of FIGS. 7 and 8 (e.g., the multi-polygon 900 of FIG. 9).

The example separator 1002 of FIGS. 10-13 includes an example shaft 1004, an example first mirror 1006, and an example second mirror 1008. The shaft 1004 defines an example longitudinal axis 1010 of the separator 1002. In the illustrated example of FIGS. 10-13, the first mirror 1006 is mechanically coupled (e.g., fixedly coupled) to the shaft 1004 and is located at an example first axial position 1102 along the longitudinal axis 1010. The second mirror 1008 is mechanically coupled (e.g., fixedly coupled) to the shaft 1004 and is located at an example second axial position 1104 along the longitudinal axis 1010. The second axial position 1104 is spaced apart from the first axial position 1102 along the longitudinal axis 1010, and is rotationally offset from the first axial position 1102 about the longitudinal axis 1010. For example, as shown in FIGS. 10-13, the second axial position 1104 is vertically spaced apart from the first axial position 1102 along the longitudinal axis 1010, and is rotationally offset from the first axial position 1102 by approximately one hundred eighty degrees (180°) about the longitudinal axis 1010.

The shaft 1004 of the separator 1002 of FIGS. 10-13 is rotatable about the longitudinal axis 1010. For example, the shaft 1004 of the separator 1002 of FIGS. 10-13 may be mechanically coupled to a motor (e.g., the separator motor 610 of FIG. 6) that is structured and/or configured to rotate the shaft 1004 about the longitudinal axis 1010. As the shaft 1004 of FIGS. 10-13 rotates, the first mirror 1006 and the second mirror 1008 of FIGS. 10-13 respectively rotate about the longitudinal axis 1010. The first mirror 1006 and the second mirror 1008 of the separator 1002 of this example rotate in unison with one another (e.g., as a fixed unit) as the shaft 1004 of the separator 1002 rotates. In the illustrated example of FIGS. 10-13, the rotation of the shaft 1004 of the separator 1002 causes the first and second mirrors 1006, 1008 to cyclically rotate through an example light-receiving sector 1012 into and/or through which pulsed light is emitted and/or projected by an example light source 1106 (e.g., a pulsed laser). The light source 1106 of the illustrated example of FIGS. 10-13 may implement the light source 614 of FIG. 6.

When the separator 1002 of FIGS. 10-13 is positioned in the first position 1000 shown in FIGS. 10 and 11, the first mirror 1006 is positioned over and/or within the light-receiving sector 1012, and the second mirror 1008 is not positioned over and/or within the light-receiving sector 1012. As shown in FIGS. 10 and 11, the first mirror 1006 directs pulsed light received at the first mirror 1006 to one of the first effective facets 716 of the first polygon 702 of the multi-polygon 700 of FIGS. 7, 8, and 10-13 while the first mirror 1006 is positioned over and/or within the light-receiving sector 1012, and/or as the first mirror 1006 rotates through the light-receiving sector 1012. Conversely, when the separator 1002 of FIGS. 10-13 is positioned in the second position 1200 shown in FIGS. 12 and 13, the second mirror 1008 is positioned over and/or within the light-receiving sector 1012, and the first mirror 1006 is not positioned over and/or within the light-receiving sector 1012. As shown in FIGS. 12 and 13, the second mirror 1008 directs pulsed light received at the second mirror 1008 to one of the second effective facets 718 of the second polygon 704 of the multi-polygon 700 of FIGS. 7, 8, and 10-13 while the second mirror 1008 is positioned over and/or within the light-receiving sector 1012, and/or as the second mirror 1008 rotates through the light-receiving sector 1012.

In the illustrated example of FIGS. 10-13, the first polygon 702 of the multi-polygon 700 includes four (4) first effective facets 716, and the separator 1002 includes one (1) first mirror 1006, thereby providing for a 4:1 ratio of first effective facets 716 to first mirrors 1006. Similarly, the second polygon 704 of the multi-polygon 700 includes four (4) second effective facets 718, and the separator 1002 includes one (1) second mirror 1008, thereby providing for a 4:1 ratio of second effective facets 718 to second mirrors 1008. Based on one or both of these ratios, the separator 1002 may be rotated in sync with the rotation of the multi-polygon 700 by rotating the separator 1002 at a cyclic speed, frequency, and/or rate that is four (4) times that of the rotation of the multi-polygon 700. As the separator 1002 of FIGS. 10-13 rotates in sync with the rotation of the multi-polygon 700 of FIGS. 7, 8, and 10-13, the first mirror 1006 and the second mirror 1008 of the separator 1002 cyclically direct pulsed light cyclically received (e.g., from the light source 1106) at the first mirror 1006 and the second mirror 1008 of the separator 1002 to alternating ones of the circumferentially interleaved first and second effective facets 716, 718 of the first and second polygons 702, 704 of the multi-polygon 700 of FIG. 7.

Figure 14:
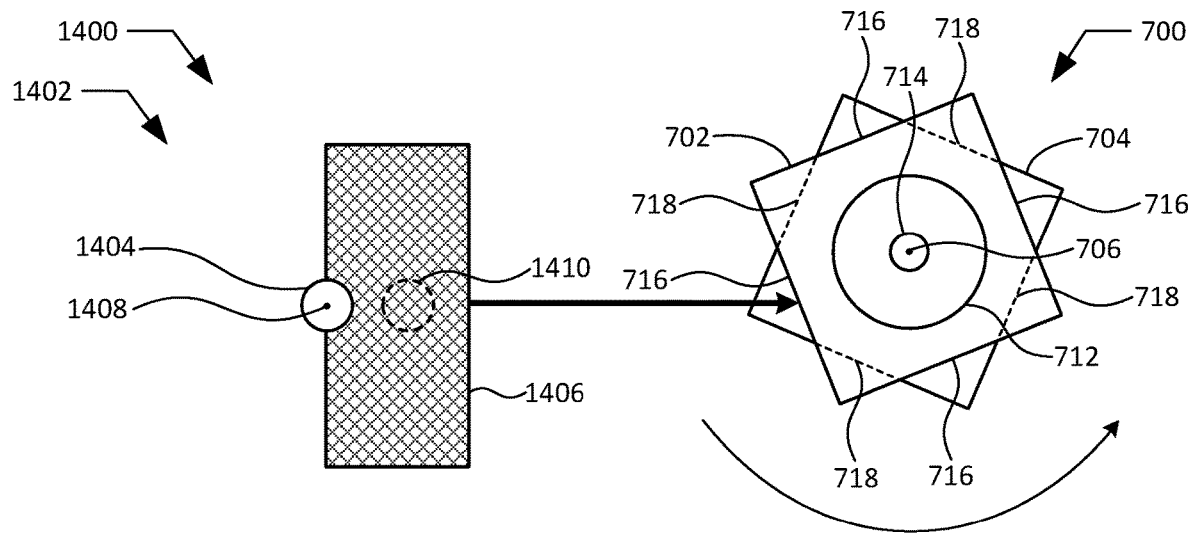
FIG. 14 is a top view of a second example separator that may be implemented by the laser scanning apparatus of FIG. 6, with the separator shown in a first example position.
Figure 15:
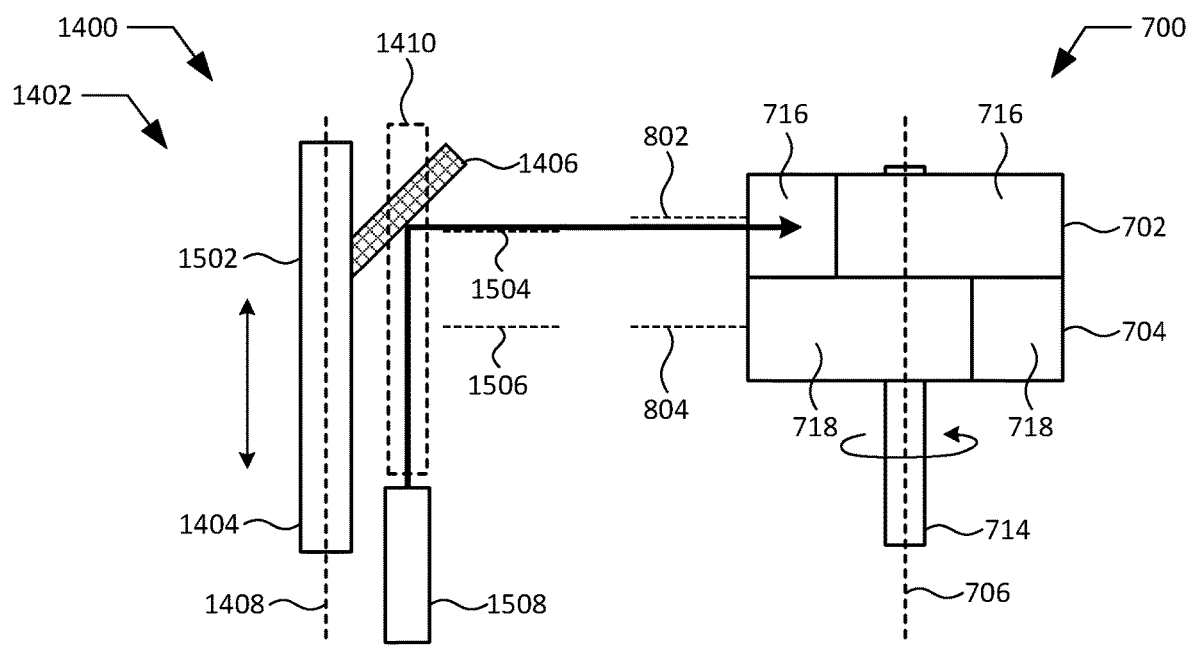
FIG. 15 is a side view of the separator of FIG. 14, with the separator shown in the first position of FIG. 14.
Figure 16:
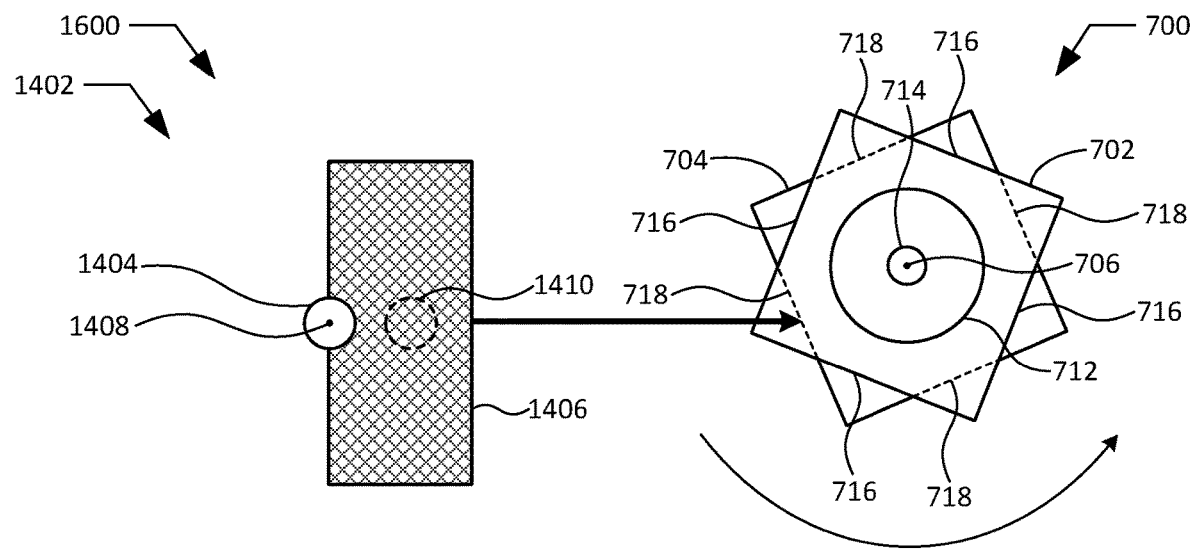
FIG. 16 is a top view of the separator of FIGS. 14 and 15, with the separator shown in a second example position.
Figure 17:
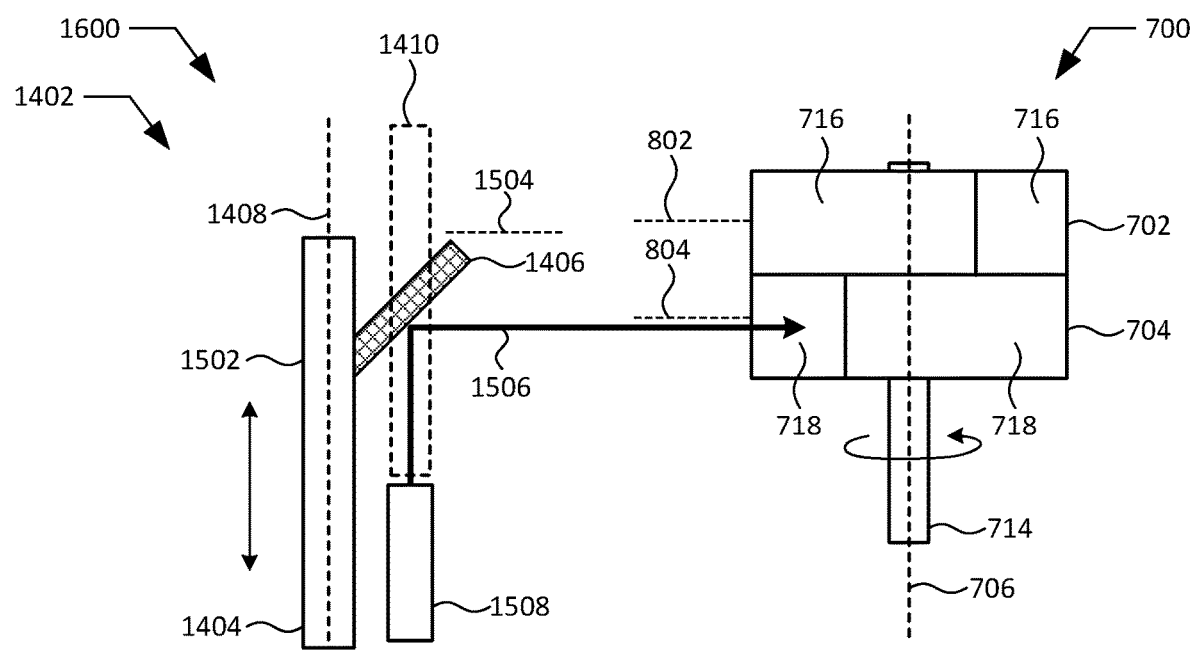
FIG. 17 is a side view of the separator of FIGS. 14-16, with the separator shown in the second position of FIG. 16.

FIG. 14 is a top view of a second example separator 1402 that may be implemented by the laser scanning apparatus 600 of FIG. 6, with the separator 1402 shown in a first example position 1400. FIG. 15 is a side view of the separator 1402 of FIG. 14, with the separator 1402 shown in the first position 1400 of FIG. 14. FIG. 16 is a top view of the separator 1402 of FIGS. 14 and 15, with the separator 1402 shown in a second example position 1600. FIG. 17 is a side view of the separator 1402 of FIGS. 14-16, with the separator 1402 shown in the second position 1600 of FIG. 16. The separator 1402 of FIGS. 14-17 may implement the separator 608 of FIG. 6. In the illustrated example of FIGS. 14-17, the separator 1402 is shown implemented in conjunction with the multi-polygon 700 of FIGS. 7 and 8 described above. In other examples, the separator 1402 of FIGS. 14-17 may alternatively be implemented with a multi-polygon other than the multi-polygon 700 of FIGS. 7 and 8 (e.g., the multi-polygon 900 of FIG. 9).

The example separator 1402 of FIGS. 14-17 includes an example shaft 1404 and an example mirror 1406. The shaft 1404 defines an example longitudinal axis 1408 of the separator 1402. In the illustrated example of FIGS. 14-17, the mirror 1406 is mechanically coupled (e.g., fixedly coupled) to the shaft 1404 and is located at an example axial position 1502 along the longitudinal axis 1408. The shaft 1404 of the separator 1402 of FIGS. 14-17 is cyclically translatable along the longitudinal axis 1408. For example, the shaft 1404 of the separator 1402 of FIGS. 14-17 may be mechanically coupled to a motor (e.g., the separator motor 610 of FIG. 6) that is structured and/or configured to cyclically translate the shaft 1404 along the longitudinal axis 1408.

As the shaft 1404 of FIGS. 14-17 cyclically translates, the mirror 1406 cyclically translates between an example first light-receiving position 1504 and example second light-receiving position 1506 spaced apart from the first light-receiving position 1504. In the illustrated example of FIGS. 14-17, the first light-receiving position 1504 and the second light-receiving position 1506 are respectively located within an example light-receiving sector 1410 into and/or through which pulsed light is emitted and/or projected by an example light source 1508 (e.g., a pulsed laser). The light source 1508 of the illustrated example of FIGS. 14-17 may implement the light source 614 of FIG. 6.

When the separator 1402 of FIGS. 14-17 is positioned in the first position 1400 shown in FIGS. 14 and 15, the mirror 1406 is positioned in the first light-receiving position 1504, and not in the second light-receiving position 1506. As shown in FIGS. 14 and 15, the mirror 1406 directs pulsed light received at the mirror 1406 to one of the first effective facets 716 of the first polygon 702 of the multi-polygon 700 of FIGS. 7, 8, and 14-17 while the mirror 1406 is positioned in the first light-receiving position 1504. Conversely, when the separator 1402 of FIGS. 14-17 is positioned in the second position 1600 shown in FIGS. 16 and 17, the mirror 1406 is positioned in the second light-receiving position 1506, and not in the first light-receiving position 1504. As shown in FIGS. 16 and 17, the mirror 1406 directs pulsed light received at the mirror 1406 to one of the second effective facets 718 of the second polygon 704 of the multi-polygon 700 of FIGS. 7, 8, and 14-17 while the mirror 1406 is positioned in the second light-receiving position 1505.

In the illustrated example of FIGS. 14-17, the first polygon 702 of the multi-polygon 700 includes four (4) first effective facets 716, and the separator 1402 includes one (1) mirror 1406, thereby providing for a 4:1 ratio of first effective facets 716 to mirrors 1406. Similarly, the second polygon 704 of the multi-polygon 700 includes four (4) second effective facets 718, and the separator 1402 includes one (1) mirror 1406, thereby providing for a 4:1 ratio of second effective facets 718 to mirrors 1406. Based on one or both of these ratios, the separator 1402 may be moved in sync with the rotation of the multi-polygon 700 by cyclically translating the separator 1402 at a cyclic speed, frequency, and/or rate that is four (4) times that of the rotation of the multi-polygon 700. As the separator 1402 of FIGS. 14-17 moves in sync with the rotation of the multi-polygon 700 of FIGS. 7, 8, and 10-13, the mirror 1406 of the separator 1402 cyclically translates, thereby cyclically directing pulsed light received (e.g., from the light source 1508) at the mirror 1406 of the separator 1402 to alternating ones of the circumferentially interleaved first and second effective facets 716, 718 of the first and second polygons 702, 704 of the multi-polygon 700 of FIG. 7.

While the example separators 1002, 1402 of FIGS. 10-17 are illustrated as being implemented in part by one or more movable (e.g., rotatable or translatable) mirror(s), in other examples the separator 608 of FIG. 6 may instead be implemented by a different device, including, for example, by another rotating polygon structured to cyclically direct pulsed light received at the separator 608 from the light source 614 of FIG. 6 to alternating ones of the circumferentially interleaved effective facets of the polygons of the multi-polygon 602 of FIG. 6 as the multi-polygon 602 rotates.

Returning to the illustrated example of FIG. 6, the example separator motor 610 of FIG. 6 is mechanically coupled (e.g., via one or more fastener(s), connector(s), shaft(s), rod(s), link(s), gear(s), etc.) to the separator 608 of FIG. 6. The separator motor 610 moves the separator 608 in sync with the rotation of the multi-polygon 602 of FIG. 6 in response to one or more control signal(s) received from the separator controller 612 of FIG. 6. The separator motor 610 of FIG. 6 may be implemented by one or more electromechanical motor(s) of any type(s), including for example, one or more servo motor(s), one or more galvo motor(s), etc. In other examples, the separator motor 610 of FIG. 6 may be eliminated in favor of one or more other device(s) (e.g., an electromagnet, a piezoelectric device, etc.) structured to move the separator 608 in sync with the rotation of the multi-polygon 602 of FIG. 6.

The example separator controller 612 of FIG. 6 provides control signals to control the speed of the separator motor 610 of FIG. 6. The separator controller 612 of FIG. 6 commands the separator motor 610 of FIG. 6 to move the separator 608 of FIG. 6 in sync with the rotation of the multi-polygon 602 of FIG. 6. For example, the separator controller 612 of FIG. 6 may generate one or more control signal(s) that, when received by the separator motor 610 of FIG. 6, cause the separator motor 610 to move the separator 608 of FIG. 6 in sync with the rotation of the multi-polygon 602 of FIG. 6. In some examples, the speed and/or frequency at which the separator 608 moves may correspond to and/or be based on the content of the control signal(s) generated by the separator controller 612 of FIG. 6.

In some examples, the separator controller 612 of FIG. 6 may command the separator motor 610 of FIG. 6 to move the separator 608 of FIG. 6 in sync with the rotation of the multi-polygon 602 of FIG. 6 in response to one or more laser scanning initiation command(s), signal(s), and/or instructions(s) received by and/or at the separator controller 612, and/or, more generally, received by and/or at the laser scanning apparatus 600 of FIG. 6. In some examples, the separator controller 612 of FIG. 6 may command the separator motor 610 of FIG. 6 to cease moving the separator 608 of FIG. 6 in response to one or more laser scanning termination command(s), signal(s), and/or instructions(s) received by and/or at the separator controller 612, and/or, more generally, received by and/or at the laser scanning apparatus 600 of FIG. 6.

The example light source 614 of FIG. 6 emits pulses of light (e.g., a beam of pulsed light) in response to one or more control signal(s) received from the light source controller 616 of FIG. 6. The light source 614 of FIG. 6 may be implemented by a pulsed laser having operational characteristics (e.g., beam intensity, beam size, spot size, pulse frequency, etc.) of any type(s) and/or value(s). In some examples, the light source 614 and/or the light source controller 616 of FIG. 6 detect(s) and/or determine(s) the respective times at which individual ones of the pulses of light emitted by the light source 614 are emitted (e.g., pulse emission times). Pulse emission time data detected and/or determined by the light source 614 and/or the light source controller 616 of FIG. 6 may be of any quantity, type(s), form(s) and/or format(s), and may be stored in a computer-readable storage medium such as the example memory 620 of FIG. 6 described below.

The example light source controller 616 of FIG. 6 outputs control signals to control the output of the light source 614 of FIG. 6. The light source controller 616 of FIG. 6 commands the light source 614 of FIG. 6 to emit pulses of light (e.g., a beam of pulsed light). For example, the light source controller 616 of FIG. 6 may generate one or more control signal(s) that, when received by the light source 614 of FIG. 6, cause the light source 614 to emit pulses of light. In some examples, the timing and/or frequency at which the light source 614 emits pulses of light may correspond to and/or be based on the content of the control signal(s) generated by the light source controller 616 of FIG. 6.

In some examples, the light source controller 616 of FIG. 6 may command the light source 614 of FIG. 6 to emit pulses of light in response to one or more laser scanning initiation command(s), signal(s), and/or instructions(s) received by and/or at the light source controller 616, and/or, more generally, received by and/or at the laser scanning apparatus 600 of FIG. 6. In some examples, the light source controller 616 of FIG. 6 may command the light source 614 of FIG. 6 to cease emitting pulses of light in response to one or more laser scanning termination command(s), signal(s), and/or instructions(s) received by and/or at the light source controller 616, and/or, more generally, received by and/or at the laser scanning apparatus 600 of FIG. 6.

The example light sensor 618 of FIG. 6 senses, measures, and/or detects pulses of light received at the light sensor 618. For example, the light sensor 618 of FIG. 6 may sense, measure, and/or detect pulses of light that originate from the light source 614 of FIG. 6 and subsequently progress (e.g., based on reflections of the pulses of light) from the light source 614 to the separator 608 of FIG. 6, from the separator 608 to the multi-polygon 602 of FIG. 6, from the multi-polygon 602 to one or more target object(s) being scanned by the laser scanning apparatus 600 of FIG. 6, and from the target object(s) to the light sensor 618 of FIG. 6. In some examples, the respective times at which individual ones of the pulses of light are detected at the light sensor 618 are time stamped as pulse return times. The pulse return time can be obtained by a circuit that records a clock time when the light sensor 618 output indicates receipt of a pulse of light. Pulse return time data detected and/or determined by the light sensor 618 of FIG. 6 may be of any quantity, type, form and/or format, and may be stored in a computer-readable storage medium such as the example memory 620 of FIG. 6 described below.

The example memory 620 of FIG. 6 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 620 may be stored in any file and/or data structure format, organization scheme, and/or arrangement.

In some examples, the memory 620 stores motor control data accessed, implemented, invoked, applied, and/or processed by and/or at the multi-polygon controller 606 of FIG. 6. In some examples, the memory 620 stores motor control data accessed, implemented, invoked, applied, and/or processed by and/or at the separator controller 612 of FIG. 6. In some examples, the memory 620 stores light source control data accessed, implemented, invoked, applied, and/or processed by and/or at the light source controller 616 of FIG. 6.

In some examples, the memory 620 stores pulse emission time data detected and/or determined by the light source 614 and/or the light source controller 616 of FIG. 6. In some examples, the memory 620 stores pulse return time data detected and/or determined by the light sensor 618 of FIG. 6. The memory 620 of FIG. 6 is accessible to the multi-polygon controller 606, the separator controller 612, the light source controller 616, and the light sensor 618, of FIG. 6, and/or, more generally, to the laser scanning apparatus 600 of FIG. 6.

The multi-polygon 602 of FIG. 6 is means for reflecting pulsed light received at circumferentially interleaved effective facets of a plurality of polygons of the multi-polygon 602 as the multi-polygon 602 rotates. The multi-polygon motor 604 of FIG. 6 is a means for rotating the multi-polygon 602 of FIG. 6. The multi-polygon controller 606 of FIG. 6 is a means for commanding the multi-polygon motor 604 of FIG. 6 to rotate the multi-polygon 602 of FIG. 6. The separator 608 of FIG. 6 is a means for cyclically directing pulsed light received from the light source 614 of FIG. 6 to alternating ones of the circumferentially interleaved facets of the polygons of the multi-polygon 602 of FIG. 6 as the multi-polygon 602 rotates. The separator motor 610 of FIG. 6 is a means for moving the separator 608 of FIG. 6 in sync with rotation of the multi-polygon 602 of FIG. 6. The separator controller 612 of FIG. 6 is a means for commanding the separator motor 610 of FIG. 6 to move the separator 608 of FIG. 6 in sync with rotation of the multi-polygon 602 of FIG. 6. The light source 614 of FIG. 6 is a means for emitting pulses of light. The light source controller 616 of FIG. 6 is a means for commanding the light source 614 of FIG. 6 to emit pulses of light. The light sensor 618 of FIG. 6 is a means for sensing pulses of light. The memory 620 of FIG. 6 is a means for storing information and/or data.

While an example manner of implementing the laser scanning apparatus 600 is illustrated in FIG. 6, one or more of the elements, processes and/or devices illustrated in FIG. 6 may be combined, divided, re-arranged, omitted, eliminated and/or implemented in any other way. Further, the example multi-polygon 602, the example multi-polygon motor 604, the example multi-polygon controller 606, the example separator 608, the example separator motor 610, the example separator controller 612, the example light source 614, the example light source controller 616, the example light sensor 618, and the example memory 620, and/or, more generally, the example laser scanning apparatus 600 of FIG. 6 may be implemented by hardware, software, firmware and/or any combination of hardware, software and/or firmware. Thus, for example, any of the example multi-polygon motor 604, the example multi-polygon controller 606, the example separator motor 610, the example separator controller 612, the example light source controller 616, the example light sensor 618, and the example memory 620, and/or, more generally, the example laser scanning apparatus 600 of FIG. 6 could be implemented by one or more analog or digital circuit(s), logic circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example multi-polygon motor 604, the example multi-polygon controller 606, the example separator motor 610, the example separator controller 612, the example light source controller 616, the example light sensor 618, and/or the example memory 620 of the example laser scanning apparatus 600 of FIG. 6 is/are hereby expressly defined to include a non-transitory computer readable storage device or storage disk such as a memory, a digital versatile disk (DVD), a compact disk (CD), a Blu-ray disk, etc. including the software and/or firmware. Further still, the example multi-polygon 602, the example multi-polygon motor 604, the example multi-polygon controller 606, the example separator 608, the example separator motor 610, the example separator controller 612, the example light source 614, the example light source controller 616, the example light sensor 618, and the example memory 620, and/or, more generally, the example laser scanning apparatus 600 of FIG. 6 may include one or more element(s), process(es) and/or device(s) in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Figure 18:
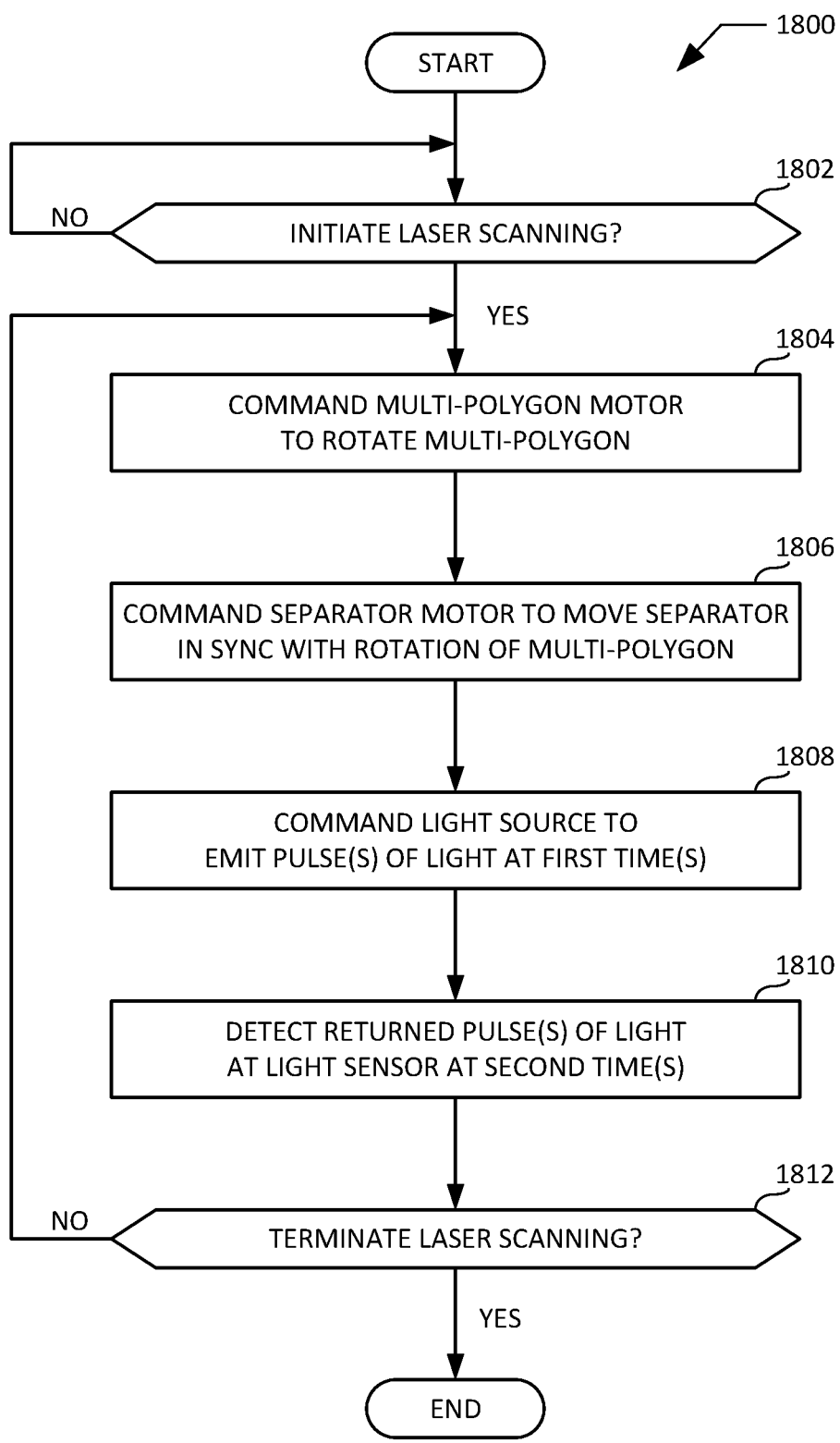
FIG. 18 is a flowchart representative of example machine readable instructions that may be executed to implement the example laser scanning apparatus of FIG. 6 to perform multi-polygon vertically-separated scanning.

A flowchart representative of example hardware logic, machine readable instructions, hardware implemented state machines, and/or any combination thereof for implementing the laser scanning apparatus 600 of FIG. 6 is shown in FIG. 18. The machine readable instructions may be one or more executable program(s) or portion(s) of executable program(s) for execution by a computer processor such as the example processor 1902 shown in the example processor platform 1900 discussed below in connection with FIG. 19. The program(s) may be embodied in software stored on a non-transitory computer readable storage medium such as a CD-ROM, a floppy disk, a hard drive, a DVD, a Blu-ray disk, or a memory associated with the processor 1902, but the entire program(s) and/or parts thereof could alternatively be executed by a device other than the processor 1902 and/or embodied in firmware or dedicated hardware. Further, although the example program(s) is/are described with reference to the flowchart illustrated in FIG. 18, many other methods of implementing the example laser scanning apparatus 600 of FIG. 6 may alternatively be used. For example, the order of execution of the blocks may be changed, and/or some of the blocks described may be changed, eliminated, or combined. Additionally or alternatively, any or all of the blocks may be implemented by one or more hardware circuit(s) (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage device(s) and/or computing device(s) (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIG. 18 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 18 is a flowchart representative of example machine readable instructions 1800 that may be executed to implement the example laser scanning apparatus 600 of FIG. 6 to perform multi-polygon vertically-separated scanning. The example program 1800 of FIG. 18 begins when the example laser scanning apparatus 600 of FIG. 6 determines whether laser scanning is to be initiated (block 1802). For example, the laser scanning apparatus 600 may receive (e.g., via a user interface or a network interface of the laser scanning apparatus 600) one or more laser scanning initiation command(s), signal(s), and/or instructions(s) indicating that laser scanning is to be initiated. If the laser scanning apparatus 600 determines at block 1802 that laser scanning is to be initiated, control of the example program 1800 of FIG. 18 proceeds to block 1804. If the laser scanning apparatus 600 instead determines at block 1802 that laser scanning is not to be initiated, control of the example program 1800 of FIG. 18 remains at block 1802.

At block 1804, the example multi-polygon controller 606 of FIG. 6 commands the example multi-polygon motor 604 of FIG. 6 to rotate the example multi-polygon 602 of FIG. 6. For example, the multi-polygon controller 606 of FIG. 6 may generate one or more control signal(s) that, when received by the multi-polygon motor 604 of FIG. 6, cause the multi-polygon motor 604 to rotate the multi-polygon 602 of FIG. 6 at a defined speed. In some examples, the speed at which the multi-polygon 602 rotates may correspond to and/or be based on the content of the control signal(s) generated by the multi-polygon controller 606 of FIG. 6. Following block 1804, control of the example program 1800 of FIG. 18 proceeds to block 1806.

At block 1806, the example separator controller 612 of FIG. 6 commands the example separator motor 610 of FIG. 6 to move the example separator 608 of FIG. 6 in sync with the rotation of the example multi-polygon 602 of FIG. 6. For example, the separator controller 612 of FIG. 6 may generate one or more control signal(s) that, when received by the separator motor 610 of FIG. 6, cause the separator motor 610 to move the separator 608 of FIG. 6 in sync with the rotation of the multi-polygon 602 of FIG. 6. In some examples, the speed and/or frequency at which the separator 608 moves may correspond to and/or be based on the content of the control signal(s) generated by the separator controller 612 of FIG. 6. Following block 1806, control of the example program 1800 of FIG. 18 proceeds to block 1808.

At block 1808, the example light source controller 616 of FIG. 6 commands the example light source 614 of FIG. 6 to emit one or more pulse(s) of light at one or more corresponding first time(s). For example, the light source controller 616 of FIG. 6 may generate one or more control signal(s) that, when received by the light source 614 of FIG. 6, cause the light source 614 to emit pulses of light at corresponding first times. In some examples, the timing and/or frequency at which the light source 614 emits the pulses of light may correspond to and/or be based on the content of the control signal(s) generated by the light source controller 616 of FIG. 6. Following block 1808, control of the example program 1800 of FIG. 18 proceeds to block 1810.

At block 1810, the example light sensor 618 of FIG. 6 detects one or more returned pulse(s) of light received at the light sensor 618 at one or more corresponding second time(s). For example, the light sensor 618 of FIG. 6 may detect, at respective second times, pulses of light originating from the light source 614 of FIG. 6 that are subsequently returned to and/or received at the light sensor 618 of FIG. 6 from one or more target object(s) off of which the pulses of light have reflected. Following block 1810, control of the example program 1800 of FIG. 18 proceeds to block 1812.

At block 1812, the example laser scanning apparatus 600 of FIG. 6 determines whether the laser scanning is to be terminated. For example, the laser scanning apparatus 600 may receive (e.g., via a user interface or a network interface of the laser scanning apparatus 600) one or more laser scanning termination command(s), signal(s), and/or instruction(s) indicating that the laser scanning initiated at block 1802 is to be terminated. If the laser scanning apparatus 600 determines at block 1812 that the laser scanning is not to be terminated, control of the example program 1800 of FIG. 18 returns to block 1804. If the laser scanning apparatus 600 instead determines at block 1812 that the laser scanning is to be terminated, the example program 1800 of FIG. 18 ends.

Figure 19:
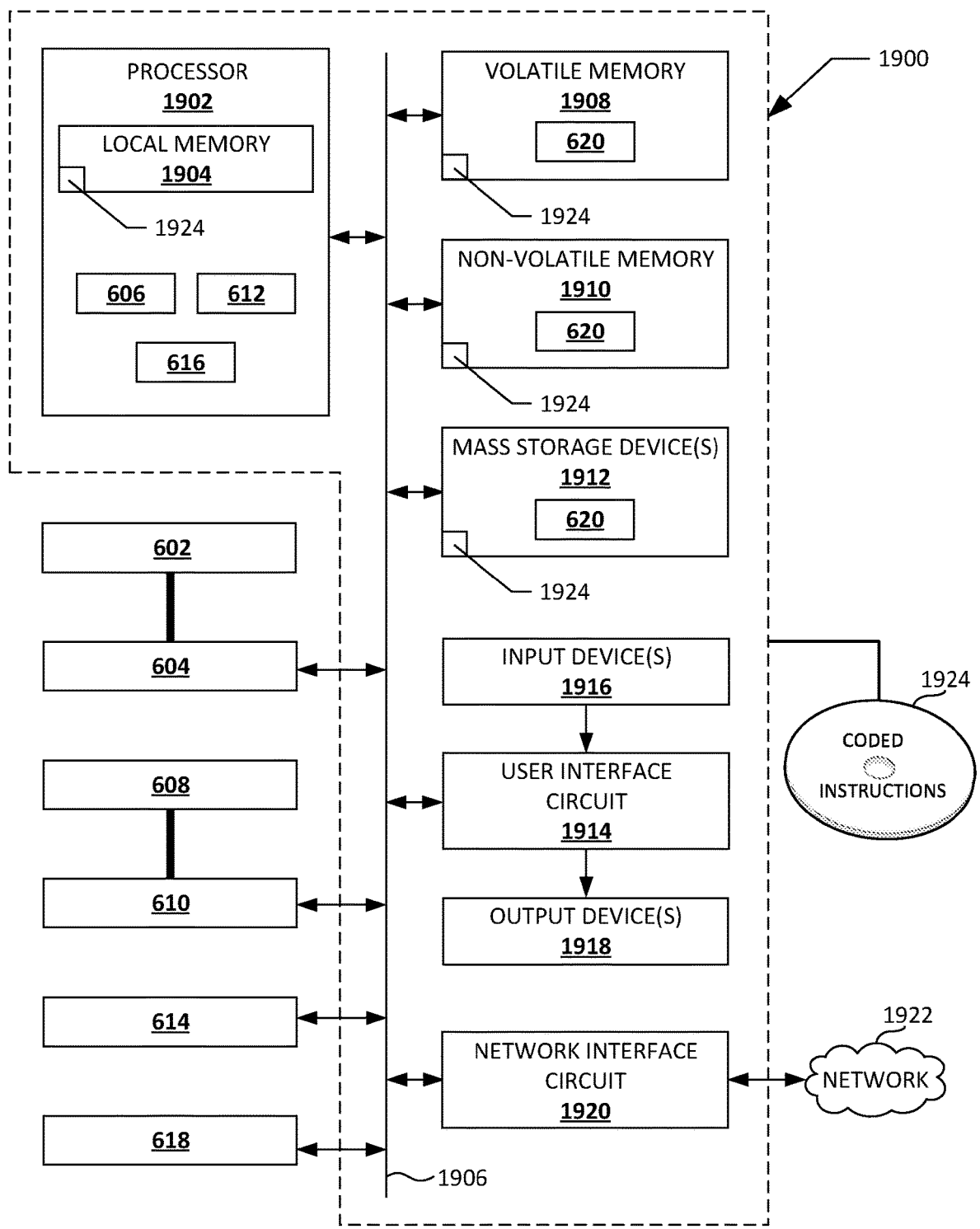
FIG. 19 is a block diagram of an example processor platform structured to execute the example machine readable instructions of FIG. 18 to implement the example laser scanning apparatus of FIG. 6.

FIG. 19 is a block diagram of an example processor platform 1900 structured to execute the example machine readable instructions 1800 of FIG. 18 to implement the example laser scanning apparatus 600 of FIG. 6. The processor platform 1900 of the illustrated example includes a processor 1902. The processor 1902 of the illustrated example is hardware. For example, the processor 1902 can be implemented by one or more integrated circuit(s), logic circuit(s), microprocessor(s), GPU(s), DSP(s), microcontroller(s), processor(s), or microcontroller(s) from any desired family or manufacturer. The hardware processor may be a semiconductor based (e.g., silicon based) device. In this example, the processor 1902 implements the example multi-polygon controller 606, the example separator controller 612, and the example light source controller 616 of FIG. 6.

The processor 1902 of the illustrated example includes a local memory 1904 (e.g., a cache). The processor 1902 is in communication with the example multi-polygon motor 604, the example separator motor 610, the example light source 614, and the example light sensor 618 of FIG. 6 via a bus 1906. The processor 1902 is also in communication with a main memory including a volatile memory 1908 and a non-volatile memory 1910 via the bus 1906. The volatile memory 1908 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1910 may be implemented by flash memory and/or any other desired type of memory device. Access to the main memory 1908, 1910 is controlled by a memory controller.

The processor platform 1900 of the illustrated example also includes one or more mass storage device(s) 1912 for storing software and/or data. Examples of such mass storage device(s) 1912 include floppy disk drives, hard drive disks, compact disk drives, Blu-ray disk drives, redundant array of independent disks (RAID) systems, and digital versatile disk (DVD) drives. In the illustrated example of FIG. 19, one or more of the volatile memory 1908, the non-volatile memory 1910, and/or the mass storage device(s) 1912 implement(s) the example memory 620 of FIG. 6.

The processor platform 1900 of the illustrated example also includes a user interface circuit 1914. The user interface circuit 1914 may be implemented by any type of interface standard, such as an Ethernet interface, a universal serial bus (USB), a Bluetooth® interface, a near field communication (NFC) interface, and/or a PCI express interface. In the illustrated example, one or more input device(s) 1916 are connected to the user interface circuit 1914. The input device(s) 1916 permit(s) a user to enter data and/or commands into the processor 1902. The input device(s) 1916 can be implemented by, for example, an audio sensor, a microphone, a camera (still or video), a keyboard, a button, a mouse, a touchscreen, a track-pad, a trackball, isopoint and/or a voice recognition system. One or more output device(s) 1918 are also connected to the user interface circuit 1914 of the illustrated example. The output device(s) 1918 can be implemented, for example, by a display device (e.g., a light emitting diode (LED), an organic light emitting diode (OLED), a liquid crystal display (LCD), a touchscreen, etc.), a tactile output device, and/or a speaker. The user interface circuit 1914 of the illustrated example, thus, typically includes a graphics driver card, a graphics driver chip and/or a graphics driver processor.

The processor platform 1900 of the illustrated example also includes a network interface circuit 1920. The network interface circuit 1920 may be implemented by any type of interface standard, such as an Ethernet interface, a universal serial bus (USB), a Bluetooth® interface, a near field communication (NFC) interface, and/or a PCI express interface. The network interface circuit 1920 may include a radio transmitter, a radio receiver, and/or a radio transceiver to facilitate the exchange of data and/or signals with external machines (e.g., a server, a computing device, etc.) via a network 1922 (e.g., a cellular network, a wireless local area network (WLAN), etc.).

Coded instructions 1924 including the machine readable instructions 1800 of FIG. 18 may be stored in the local memory 1904, in the volatile memory 1908, in the non-volatile memory 1910, on the mass storage device(s) 1912, and/or on a removable non-transitory computer readable storage medium such as a flash memory stick, a CD, or a DVD.

From the foregoing, it will be appreciated that example multi-polygon, vertically-separated laser scanning apparatus and methods have been disclosed. Example laser scanning apparatus and methods disclosed herein include a multi-polygon having two or more polygons that are rotationally offset relative to one another about a central axis of the multi-polygon, and stacked (e.g., positioned adjacent (in some examples, separated from) and/or in face-to-face contact relative to one another) along the central axis of the multi-polygon. The rotationally-offset, stacked arrangement of the polygons included in example multi-polygons disclosed herein provides numerous advantages for example laser scanning apparatus relative to the capabilities and/or characteristics of conventional single-polygon laser scanning systems described above.

For example, by implementing a multi-polygon having a rotationally-offset, stacked arrangement of two or more polygons, example laser scanning apparatus disclosed herein can advantageously be structured and/or configured to have a size (e.g. a diameter) associated with providing a desired field of view and a desired scanning efficiency that is substantially smaller and/or more compact relative to the size of the corresponding polygon component that would be required to provide the same desired field of view and the same desired scanning efficiency in a single-polygon implementation. Implementing a multi-polygon having a rotationally-offset, stacked arrangement of two or more polygons advantageously enables example laser scanning apparatus and methods disclosed herein to achieve the aforementioned size-reduction benefit while maintaining the ability to provide (e.g., via the multi-polygon) an optically-fast, sawtooth scanning pattern.

In addition to implementing an example multi-polygon as disclosed herein, example laser scanning apparatus and methods disclosed herein further include a separator structured and/or configured to operate in sync with the multi-polygon to advantageously generate vertical separation with respect to pulses of light emitted toward and reflected off of respective ones of the polygons of the multi-polygon. For instance, example separators disclosed herein may cause pulses of light emitted from a light source at first times to be directed toward and reflect off of a first one of the polygons of an example multi-polygon disclosed herein, and may further cause pulses of light emitted from the light source at second times to be directed toward and reflect off of a second one of the polygons of the multi-polygon neighboring (e.g., stacked above or below) the first one of the polygons of the multi-polygon. Thus, example separators disclosed herein advantageously impart vertical separation to the scanning process in addition to the horizontal separations imparted by respective ones of the polygons of the multi-polygon.

In some examples, an apparatus is disclosed. In some disclosed examples, the apparatus comprises a multi-polygon. In some disclosed examples, the multi-polygon includes a first polygon, a central axis, and a second polygon. In some disclosed examples, the first polygon includes a first plurality of outwardly-facing mirrored facets. In some disclosed examples, the second polygon includes a second plurality of outwardly-facing mirrored facets angularly offset about the central axis relative to the first plurality of outwardly-facing mirrored facets. In some disclosed examples, the second polygon is positioned relative to the first polygon along the central axis. In some disclosed examples, the first and second polygons are rotatable about the central axis.

In some disclosed examples, the multi-polygon further includes a first plurality of effective facets defined by portions of the first plurality of outwardly-facing mirrored facets that are overlapped by portions of the second plurality of outwardly-facing mirrored facets. In some disclosed examples, the multi-polygon further includes a second plurality of effective facets defined by portions of the second plurality of outwardly-facing mirrored facets that are overlapped by portions of the first plurality of outwardly-facing mirrored facets. In some disclosed examples, the second plurality of effective facets are circumferentially interleaved with the first plurality of effective facets about the central axis.

In some disclosed examples, the first and second polygons are configured to separate first reflected pulses of light from one another along a first plane. In some disclosed examples, the first reflected pulses of light are reflected from one of the first plurality of effective facets as the first and second polygons rotate about the central axis. In some disclosed examples, the first and second polygons are to separate second reflected pulses of light from one another along a second plane. In some disclosed examples, the second reflected pulses of light are reflected from one of the second plurality of effective facets as the first and second polygons rotate about the central axis. In some disclosed examples, the second plane is parallel to and separated from the first plane.

In some disclosed examples, the central axis is orthogonal to the first plane and to the second plane, and the second plane is separated from the first plane.

In some disclosed examples, the apparatus further includes a separator to cyclically direct pulsed light from a light source to alternating ones of the circumferentially interleaved first plurality and second plurality of effective facets as the first and second polygons rotate about the central axis.

In some disclosed examples, the separator includes a shaft, a first mirror, and a second mirror. In some disclosed examples, the shaft has a longitudinal axis. In some disclosed examples, the first mirror is coupled to the shaft and is located at a first axial position along the longitudinal axis. In some disclosed examples, the second mirror is coupled to the shaft and is located at a second axial position along the longitudinal axis. In some disclosed examples, the second axial position is spaced apart from the first axial position. In some disclosed examples, the shaft is rotatable about the longitudinal axis to cyclically rotate the first and second mirrors through a light-receiving sector. In some disclosed examples, the first mirror is to direct pulsed light to one of the first plurality of effective facets as the first mirror is rotated through the light-receiving sector. In some disclosed examples, the second mirror is to direct pulsed light to one of the second plurality of effective facets as the second mirror is rotated through the light-receiving sector.

In some disclosed examples, the separator includes a shaft and a mirror. In some disclosed examples, the shaft has a longitudinal axis. In some disclosed examples, the mirror is coupled to the shaft and is located at an axial position along the longitudinal axis. In some disclosed examples, the shaft is translatable along the longitudinal axis to cyclically move the mirror between a first light-receiving position and a second light-receiving position. In some disclosed examples, the second light-receiving position is spaced apart from the first light-receiving position. In some disclosed examples, the mirror is to direct pulsed light to one of the first plurality of effective facets when the mirror is in the first light-receiving position. In some disclosed examples, the mirror is to direct pulsed light to one of the second plurality of effective facets when the mirror is in the second light-receiving position.

In some disclosed examples, the apparatus further includes a first motor and a second motor. In some disclosed examples, the first motor is to rotate the first and second polygons about the central axis. In some disclosed examples, the second motor is to move the separator in sync with the rotation of the first and second polygons.

In some disclosed examples, the apparatus further includes a first controller and a second controller. In some disclosed examples, the first controller is to command the first motor to rotate the first and second polygons. In some disclosed examples, the second controller is to command the second motor to move the separator in sync with the rotation of the first and second polygons.

In some examples, a method is disclosed. In some disclosed examples, the method comprises rotating a first polygon of a multi-polygon about a central axis of the multi-polygon. In some disclosed examples, the first polygon includes a first plurality of outwardly-facing mirrored facets. In some disclosed examples, the method further comprises rotating a second polygon of the multi-polygon about the central axis. In some disclosed examples, the second polygon includes a second plurality of outwardly-facing mirrored facets angularly offset about the central axis relative to the first plurality of outwardly-facing mirrored facets. In some disclosed examples, the second polygon is positioned relative to the first polygon along the central axis. In some disclosed examples, the method further comprises cyclically directing pulsed light from a light source to alternating ones of a first plurality and a second plurality of effective facets as the first and second polygons rotate about the central axis. In some disclosed examples, the first plurality of effective facets are defined by portions of the first plurality of outwardly-facing mirrored facets that are overlapped by portions of the second plurality of outwardly-facing mirrored facets. In some disclosed examples, the second plurality of effective facets are defined by portions of the second plurality of outwardly-facing mirrored facets that are overlapped by portions of the first plurality of outwardly-facing mirrored facets. In some disclosed examples, the second plurality of effective facets are circumferentially interleaved with the first plurality of effective facets about the central axis.

In some disclosed examples, the method further includes separating first reflected pulses of light from one another along a first plane. In some disclosed examples, the first reflected pulses of light are reflected from one of the first plurality of effective facets as the first and second polygons rotate about the central axis. In some disclosed examples, the method further includes separating second reflected pulses of light from one another along a second plane. In some disclosed examples, the second reflected pulses of light are reflected from one of the second plurality of effective facets as the first and second polygons rotate about the central axis. In some disclosed examples, the second plane is parallel to and separated from the first plane.

In some disclosed examples, the central axis is orthogonal to the first plane and to the second plane, and the second plane is separated from the first plane.

In some disclosed examples, cyclically directing the pulsed light includes moving a separator.

In some disclosed examples, the separator includes a shaft, a first mirror, and a second mirror. In some disclosed examples, the shaft has a longitudinal axis. In some disclosed examples, the first mirror is coupled to the shaft and located at a first axial position along the longitudinal axis, and the second mirror is coupled to the shaft and located at a second axial position along the longitudinal axis. In some disclosed examples, the second axial position is spaced apart from the first axial position. In some disclosed examples, moving the separator includes rotating the shaft about the longitudinal axis to cyclically rotate the first and second mirrors through a light-receiving sector. In some disclosed examples, the first mirror is to direct pulsed light to one of the first plurality of effective facets as the first mirror is rotated through the light-receiving sector. In some disclosed examples, the second mirror is to direct pulsed light to one of the second plurality of effective facets as the second mirror is rotated through the light-receiving sector.

In some disclosed examples, the separator includes a shaft and a mirror. In some disclosed examples, the shaft has a longitudinal axis. In some disclosed examples, the mirror is coupled to the shaft and located at an axial position along the longitudinal axis. In some disclosed examples, moving the separator includes translating the shaft along the longitudinal axis to cyclically move the mirror between a first light-receiving position and a second light-receiving position. In some disclosed examples, the second light-receiving position is spaced apart from the first light-receiving position. In some disclosed examples, the mirror is to direct pulsed light to one of the first plurality of effective facets when the mirror is in the first light-receiving position. In some disclosed examples, the mirror is to direct pulsed light to one of the second plurality of effective facets when the mirror is in the second light-receiving position.

In some disclosed examples, the first and second polygons are rotated about the central axis via a first motor, and the separator is moved in sync with the rotation of the first and second polygons via a second motor.

In some disclosed examples, the method further includes commanding the first motor to rotate the first and second polygons about the central axis. In some disclosed examples, the method further includes commanding the second motor to move the separator in sync with the rotation of the first and second polygons.

In some disclosed examples, a non-transitory computer-readable storage medium comprising instructions is disclosed. In some disclosed examples, the instructions, when executed, cause one or more processors of a machine to command a first motor to rotate first and second polygons of a multi-polygon about a central axis of the multi-polygon. In some disclosed examples, the first polygon includes a first plurality of outwardly-facing mirrored facets. In some disclosed examples, the second polygon includes a second plurality of outwardly-facing mirrored facets angularly offset about the central axis relative to the first plurality of outwardly-facing mirrored facets. In some disclosed examples, the second polygon is positioned relative to the first polygon along the central axis. In some disclosed examples, the first polygon further includes a first plurality of effective facets defined by portions of the first plurality of outwardly-facing mirrored facets that are overlapped by portions of the second plurality of outwardly-facing mirrored facets. In some disclosed examples, the second polygon further includes a second plurality of effective facets defined by portions of the second plurality of outwardly-facing mirrored facets that are overlapped by portions of the first plurality of outwardly-facing mirrored facets. In some disclosed examples, the second plurality of effective facets are circumferentially interleaved with the first plurality of effective facets about the central axis. In some disclosed examples, the instructions, when executed, cause the one or more processors to command a second motor to move a separator in sync with the rotation of the first and second polygons to cyclically direct pulsed light from a light source to alternating ones of the circumferentially interleaved first plurality and second plurality of effective facets as the first and second polygons rotate about the central axis.

In some disclosed examples, the separator includes a shaft, a first mirror, and a second mirror. In some disclosed examples, the shaft has a longitudinal axis. In some disclosed examples, the first mirror is coupled to the shaft and is located at a first axial position along the longitudinal axis. In some disclosed examples, the second mirror is coupled to the shaft and is located at a second axial position along the longitudinal axis. In some disclosed examples, the second axial position is spaced apart from the first axial position. In some disclosed examples, the instructions, when executed, cause the one or more processors to command the second motor to rotate the shaft about the longitudinal axis to cyclically rotate the first and second mirrors through a light-receiving sector. In some disclosed examples, the first mirror is to direct pulsed light to one of the first plurality of effective facets as the first mirror is rotated through the light-receiving sector. In some disclosed examples, the second mirror is to direct pulsed light to one of the second plurality of effective facets as the second mirror is rotated through the light-receiving sector.

In some disclosed examples, the separator includes a shaft and a mirror. In some disclosed examples, the shaft has a longitudinal axis. In some disclosed examples, the mirror is coupled to the shaft and is located at an axial position along the longitudinal axis. In some disclosed examples, the instructions, when executed, cause the one or more processors to command the second motor to translate the shaft along the longitudinal axis to cyclically move the mirror between a first light-receiving position and a second light-receiving position. In some disclosed examples, the second light-receiving position is spaced apart from the first light-receiving position. In some disclosed examples, the mirror is to direct pulsed light to one of the first plurality of effective facets when the mirror is in the first light-receiving position. In some disclosed examples, the mirror is to direct pulsed light to one of the second plurality of effective facets when the mirror is in the second light-receiving position.

In some examples, an apparatus is disclosed. In some disclosed examples, the apparatus comprises a multi-polygon including a first polygon, a second polygon, and a central axis. In some disclosed examples, the first polygon includes a first plurality of outwardly-facing mirrored facets. In some disclosed examples, the second polygon includes a second plurality of outwardly-facing mirrored facets angularly offset about the central axis relative to the first plurality of outwardly-facing mirrored facets. In some disclosed examples, the second polygon is positioned relative to the first polygon along the central axis. In some disclosed examples, the multi-polygon is rotatable about the central axis. In some disclosed examples, the first polygon further includes a first plurality of effective facets defined by portions of the first plurality of outwardly-facing mirrored facets that are overlapped by portions of the second plurality of outwardly-facing mirrored facets. In some disclosed examples, the second polygon further includes a second plurality of effective facets defined by portions of the second plurality of outwardly-facing mirrored facets that are overlapped by portions of the first plurality of outwardly-facing mirrored facets. In some disclosed examples, the second plurality of effective facets are circumferentially interleaved with the first plurality of effective facets about the central axis. In some disclosed examples, the apparatus further comprises means for cyclically directing pulsed light. In some disclosed examples, the means for cyclically directing pulsed light is to cyclically direct pulsed light from a light source to alternating ones of the circumferentially interleaved first plurality and second plurality of effective facets of the multi-polygon as the multi-polygon rotates about the central axis.

In some disclosed examples, the multi-polygon is configured to separate first reflected pulses of light from one another along a first plane. In some disclosed examples, the first reflected pulses of light are reflected from one of the first plurality of effective facets as the multi-polygon rotates about the central axis. In some disclosed examples, the multi-polygon is further to separate second reflected pulses of light from one another along a second plane. In some disclosed examples, the second reflected pulses of light are reflected from one of the second plurality of effective facets as the multi-polygon rotates about the central axis. In some disclosed examples, the second plane is parallel to and separated from the first plane.

In some disclosed examples, the central axis is orthogonal to the first plane and to the second plane, and the second plane is separated from the first plane.

In some disclosed examples, the means for cyclically directing pulsed light includes a shaft, a first mirror, and a second mirror. In some disclosed examples, the shaft has a longitudinal axis. In some disclosed examples, the first mirror is coupled to the shaft and is located at a first axial position along the longitudinal axis. In some disclosed examples, the second mirror is coupled to the shaft and is located at a second axial position along the longitudinal axis. In some disclosed examples, the second axial position is spaced apart from the first axial position. In some disclosed examples, the shaft is rotatable about the longitudinal axis to cyclically rotate the first and second mirrors through a light-receiving sector. In some disclosed examples, the first mirror is to direct pulsed light to one of the first plurality of effective facets of the multi-polygon as the first mirror is rotated through the light-receiving sector. In some disclosed examples, the second mirror is to direct pulsed light to one of the second plurality of effective facets of the multi-polygon as the second mirror is rotated through the light-receiving sector.

In some disclosed examples, the means for cyclically directing pulsed light includes a shaft and a mirror. In some disclosed examples, the shaft has a longitudinal axis. In some disclosed examples, the mirror is coupled to the shaft and is located at an axial position along the longitudinal axis. In some disclosed examples, the shaft is translatable along the longitudinal axis to cyclically move the mirror between a first light-receiving position and a second light-receiving position. In some disclosed examples, the second light-receiving position is spaced apart from the first light-receiving position. In some disclosed examples, the mirror is to direct pulsed light to one of the first plurality of effective facets of the multi-polygon when the mirror is in the first light-receiving position. In some disclosed examples, the mirror is to direct pulsed light to one of the second plurality of effective facets of the multi-polygon when the mirror is in the second light-receiving position.

In some disclosed examples, the apparatus further includes means for rotating the multi-polygon about the central axis. In some disclosed examples, the apparatus further includes means for moving the means for cyclically directing pulsed light in sync with the rotation of the multi-polygon.

In some disclosed examples, the apparatus further includes a first controller operatively coupled to the means for rotating the multi-polygon. In some disclosed examples, the first controller is to command the means for rotating the multi-polygon to rotate the multi-polygon. In some disclosed examples, the apparatus further includes a second controller operatively coupled to the means for moving the means for cyclically directing pulsed light. In some disclosed examples, the second controller is to command the means for moving the means for cyclically directing pulsed light to move the means for cyclically directing pulsed light in sync with the rotation of the multi-polygon.

In some examples, a multi-polygon for a laser-based scanning apparatus is disclosed. In some disclosed examples, the multi-polygon includes a first polygon, a central axis, and a second polygon. In some disclosed examples, the first polygon includes a first plurality of outwardly-facing mirrored facets. In some disclosed examples, the second polygon includes a second plurality of outwardly-facing mirrored facets angularly offset about the central axis relative to the first plurality of outwardly-facing mirrored facets. In some disclosed examples, the second polygon is positioned relative to the first polygon along the central axis. In some disclosed examples, the first and second polygons are rotatable about the central axis.

In some disclosed examples, the multi-polygon further includes a first plurality of effective facets defined by portions of the first plurality of outwardly-facing mirrored facets that are overlapped by portions of the second plurality of outwardly-facing mirrored facets, and a second plurality of effective facets defined by portions of the second plurality of outwardly-facing mirrored facets that are overlapped by portions of the first plurality of outwardly-facing mirrored facets. In some disclosed examples, the second plurality of effective facets are circumferentially interleaved with the first plurality of effective facets about the central axis.

In some disclosed examples, the first and second polygons are configured to separate first reflected pulses of light from one another along a first plane. In some disclosed examples, the first reflected pulses of light are reflected from one of the first plurality of effective facets as the first and second polygons rotate about the central axis. In some disclosed examples, the first and second polygons are configured to separate second reflected pulses of light from one another along a second plane. In some disclosed examples, the second reflected pulses of light are reflected from one of the second plurality of effective facets as the first and second polygons rotate about the central axis. In some disclosed examples, the second plane is parallel to and separated from the first plane.

In some disclosed examples, the central axis is orthogonal to the first plane and to the second plane, and the second plane is separated from the first plane.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
    a multi-polygon, the multi-polygon including:
        a first polygon including a first plurality of outwardly-facing mirrored facets;
        a central axis;
        a second polygon including a second plurality of outwardly-facing mirrored facets angularly offset about the central axis relative to the first plurality of outwardly-facing mirrored facets, the second polygon positioned relative to the first polygon along the central axis, wherein the first and second polygons are rotatable about the central axis;
    a first plurality of effective facets defined by portions of the first plurality of outwardly-facing mirrored facets that are overlapped by portions of the second plurality of outwardly-facing mirrored facets; and
    a second plurality of effective facets defined by portions of the second plurality of outwardly-facing mirrored facets that are overlapped by portions of the first plurality of outwardly-facing mirrored facets, wherein the second plurality of effective facets are circumferentially interleaved with the first plurality of effective facets about the central axis, wherein the first and second polygons are to:
        separate first reflected pulses of light from one another along a first plane, the first reflected pulses of light being reflected from one of the first plurality of effective facets as the first and second polygons rotate about the central axis; and
        separate second reflected pulses of light from one another along a second plane, the second reflected pulses of light being reflected from one of the second plurality of effective facets as the first and second polygons rotate about the central axis, wherein the second plane is parallel to and separated from the first plane.

2. The apparatus as defined in claim 1, wherein the central axis is orthogonal to the first plane and to the second plane, and wherein the second plane is separated from the first plane.

3. The apparatus as defined in claim 1, further including a separator to cyclically direct pulsed light from a light source to alternating ones of the circumferentially interleaved first plurality and second plurality of effective facets as the first and second polygons rotate about the central axis.

4. The apparatus as defined in claim 3, wherein the separator includes a shaft, a first mirror, and a second mirror, the shaft having a longitudinal axis, the first mirror coupled to the shaft and located at a first axial position along the longitudinal axis, the second mirror coupled to the shaft and located at a second axial position along the longitudinal axis, the second axial position spaced apart from the first axial position, the shaft rotatable about the longitudinal axis to cyclically rotate the first and second mirrors through a light-receiving sector, the first mirror to direct pulsed light to one of the first plurality of effective facets as the first mirror is rotated through the light-receiving sector, the second mirror to direct pulsed light to one of the second plurality of effective facets as the second mirror is rotated through the light-receiving sector.

5. The apparatus as defined in claim 3, wherein the separator includes a shaft and a mirror, the shaft having a longitudinal axis, the mirror coupled to the shaft and located at an axial position along the longitudinal axis, the shaft translatable along the longitudinal axis to cyclically move the mirror between a first light-receiving position and a second light-receiving position, the second light-receiving position spaced apart from the first light-receiving position, the mirror to direct pulsed light to one of the first plurality of effective facets when the mirror is in the first light-receiving position, the mirror to direct pulsed light to one of the second plurality of effective facets when the mirror is in the second light-receiving position.

6. The apparatus as defined in claim 3, further including:
    a first motor to rotate the first and second polygons about the central axis; and
    a second motor to move the separator in sync with the rotation of the first and second polygons.

7. The apparatus as defined in claim 6, further including:
    a first controller to command the first motor to rotate the first and second polygons; and
    a second controller to command the second motor to move the separator in sync with the rotation of the first and second polygons.

8. A method, comprising:
    rotating a first polygon of a multi-polygon about a central axis of the multi-polygon, the first polygon including a first plurality of outwardly-facing mirrored facets;
    rotating a second polygon of the multi-polygon about the central axis, the second polygon including a second plurality of outwardly-facing mirrored facets angularly offset about the central axis relative to the first plurality of outwardly-facing mirrored facets, wherein the second polygon is positioned relative to the first polygon along the central axis; and cyclically directing pulsed light from a light source to alternating ones of a first plurality and a second plurality of effective facets as the first and second polygons rotate about the central axis, the first plurality of effective facets defined by portions of the first plurality of outwardly-facing mirrored facets that are overlapped by portions of the second plurality of outwardly-facing mirrored facets, the second plurality of effective facets defined by portions of the second plurality of outwardly-facing mirrored facets that are overlapped by portions of the first plurality of outwardly-facing mirrored facets, wherein the second plurality of effective facets are circumferentially interleaved with the first plurality of effective facets about the central axis.

9. The method as defined in claim 8, further including:
separating first reflected pulses of light from one another along a first plane, the first reflected pulses of light being reflected from one of the first plurality of effective facets as the first and second polygons rotate about the central axis; and
separating second reflected pulses of light from one another along a second plane, the second reflected pulses of light being reflected from one of the second plurality of effective facets as the first and second polygons rotate about the central axis, wherein the second plane is parallel to and separated from the first plane.

10. The method as defined in claim 9, wherein the central axis is orthogonal to the first plane and to the second plane, and wherein the second plane is separated from the first plane.

11. The method as defined in claim 8, wherein cyclically directing the pulsed light includes moving a separator.

12. The method as defined in claim 11, wherein the separator includes a shaft, a first mirror, and a second mirror, the shaft having a longitudinal axis, the first mirror coupled to the shaft and located at a first axial position along the longitudinal axis, the second mirror coupled to the shaft and located at a second axial position along the longitudinal axis, the second axial position spaced apart from the first axial position, and wherein moving the separator includes rotating the shaft about the longitudinal axis to cyclically rotate the first and second mirrors through a light-receiving sector, the first mirror to direct pulsed light to one of the first plurality of effective facets as the first mirror is rotated through the light-receiving sector, the second mirror to direct pulsed light to one of the second plurality of effective facets as the second mirror is rotated through the light-receiving sector.

13. The method as defined in claim 11, wherein the separator includes a shaft and a mirror, the shaft having a longitudinal axis, the mirror coupled to the shaft and located at an axial position along the longitudinal axis, and wherein moving the separator includes translating the shaft along the longitudinal axis to cyclically move the mirror between a first light-receiving position and a second light-receiving position, the second light-receiving position spaced apart from the first light-receiving position, the mirror to direct pulsed light to one of the first plurality of effective facets when the mirror is in the first light-receiving position, the mirror to direct pulsed light to one of the second plurality of effective facets when the mirror is in the second light-receiving position.

14. The method as defined in claim 11, wherein the first and second polygons are rotated about the central axis via a first motor, and the separator is moved in sync with the rotation of the first and second polygons via a second motor.

15. The method as defined in claim 14, further including:
commanding the first motor to rotate the first and second polygons about the central axis;
commanding the second motor to move the separator in sync with the rotation of the first and second polygons.

16. A non-transitory computer-readable storage medium comprising instructions that, when executed, cause one or more processors of a machine to at least:
command a first motor to rotate first and second polygons of a multi-polygon about a central axis of the multi-polygon, the first polygon including a first plurality of outwardly-facing mirrored facets, the second polygon including a second plurality of outwardly-facing mirrored facets angularly offset about the central axis relative to the first plurality of outwardly-facing mirrored facets, the second polygon positioned relative to the first polygon along the central axis, the first polygon further including a first plurality of effective facets defined by portions of the first plurality of outwardly-facing mirrored facets that are overlapped by portions of the second plurality of outwardly-facing mirrored facets, the second polygon further including a second plurality of effective facets defined by portions of the second plurality of outwardly-facing mirrored facets that are overlapped by portions of the first plurality of outwardly-facing mirrored facets, wherein the second plurality of effective facets are circumferentially interleaved with the first plurality of effective facets about the central axis; and
command a second motor to move a separator in sync with the rotation of the first and second polygons to cyclically direct pulsed light from a light source to alternating ones of the circumferentially interleaved first plurality and second plurality of effective facets as the first and second polygons rotate about the central axis.

17. The non-transitory computer-readable storage medium as defined in claim 16, wherein the separator includes a shaft, a first mirror, and a second mirror, the shaft having a longitudinal axis, the first mirror coupled to the shaft and located at a first axial position along the longitudinal axis, the second mirror coupled to the shaft and located at a second axial position along the longitudinal axis, the second axial position spaced apart from the first axial position, and wherein the instructions, when executed, cause the one or more processors to command the second motor to rotate the shaft about the longitudinal axis to cyclically rotate the first and second mirrors through a light-receiving sector, the first mirror to direct pulsed light to one of the first plurality of effective facets as the first mirror is rotated through the light-receiving sector, the second mirror to direct pulsed light to one of the second plurality of effective facets as the second mirror is rotated through the light-receiving sector.

18. The non-transitory computer-readable storage medium as defined in claim 16, wherein the separator includes a shaft and a mirror, the shaft having a longitudinal axis, the mirror coupled to the shaft and located at an axial position along the longitudinal axis, and wherein the instructions, when executed, cause the one or more processors to command the second motor to translate the shaft along the longitudinal axis to cyclically move the mirror between a first light-receiving position and a second light-receiving position, the second light-receiving position spaced apart from the first light-receiving position, the mirror to direct pulsed light to one of the first plurality of effective facets when the mirror is in the first light-receiving position, the mirror to direct pulsed light to one of the second plurality of effective facets when the mirror is in the second light-receiving position.

19. An apparatus, comprising:
a multi-polygon including a first polygon, a second polygon, and a central axis, the first polygon including a first plurality of outwardly-facing mirrored facets, the second polygon including a second plurality of outwardly-facing mirrored facets angularly offset about the central axis relative to the first plurality of outwardly-facing mirrored facets, the second polygon positioned relative to the first polygon along the central axis, the multi-polygon rotatable about the central axis, the first polygon further including a first plurality of effective facets defined by portions of the first plurality of outwardly-facing mirrored facets that are overlapped by portions of the second plurality of outwardly-facing mirrored facets, the second polygon further including a second plurality of effective facets defined by portions of the second plurality of outwardly-facing mirrored facets that are overlapped by portions of the first plurality of outwardly-facing mirrored facets, wherein the second plurality of effective facets are circumferentially interleaved with the first plurality of effective facets about the central axis; and
a separator to cyclically direct pulsed light from a light source to alternating ones of the circumferentially interleaved first plurality and second plurality of effective facets of the multi-polygon as the multi-polygon rotates about the central axis.

20. The apparatus as defined in claim 19, wherein the multi-polygon is to:
separate first reflected pulses of light from one another along a first plane, the first reflected pulses of light being reflected from one of the first plurality of effective facets as the multi-polygon rotates about the central axis; and
separate second reflected pulses of light from one another along a second plane, the second reflected pulses of light being reflected from one of the second plurality of effective facets as the multi-polygon rotates about the central axis, wherein the second plane is parallel to and separated from the first plane.

21. The apparatus as defined in claim 20, wherein the central axis is orthogonal to the first plane and to the second plane, and wherein the second plane is separated from the first plane.

22. The apparatus as defined in claim 19, wherein the separator includes a shaft, a first mirror, and a second mirror, the shaft having a longitudinal axis, the first mirror coupled to the shaft and located at a first axial position along the longitudinal axis, the second mirror coupled to the shaft and located at a second axial position along the longitudinal axis, the second axial position spaced apart from the first axial position, the shaft rotatable about the longitudinal axis to cyclically rotate the first and second mirrors through a light-receiving sector, the first mirror to direct pulsed light to one of the first plurality of effective facets of the multi-polygon as the first mirror is rotated through the light-receiving sector, the second mirror to direct pulsed light to one of the second plurality of effective facets of the multi-polygon as the second mirror is rotated through the light-receiving sector.

23. The apparatus as defined in claim 19, wherein the separator includes a shaft and a mirror, the shaft having a longitudinal axis, the mirror coupled to the shaft and located at an axial position along the longitudinal axis, the shaft translatable along the longitudinal axis to cyclically move the mirror between a first light-receiving position and a second light-receiving position, the second light-receiving position spaced apart from the first light-receiving position, the mirror to direct pulsed light to one of the first plurality of effective facets of the multi-polygon when the mirror is in the first light-receiving position, the mirror to direct pulsed light to one of the second plurality of effective facets of the multi-polygon when the mirror is in the second light-receiving position.

24. The apparatus as defined in claim 19, further including:
a first motor to rotate the multi-polygon about the central axis; and
a second motor to move the separator in sync with the rotation of the multi-polygon.

25. The apparatus as defined in claim 24, further including:
first controller circuitry to command the first motor to rotate the multi-polygon; and
second controller circuitry to command the second motor to move the separator in sync with the rotation of the multi-polygon.

26. A multi-polygon for a laser-based scanning apparatus, the multi-polygon comprising:
a first polygon including a first plurality of outwardly-facing mirrored facets;
a central axis;
a second polygon including a second plurality of outwardly-facing mirrored facets angularly offset about the central axis relative to the first plurality of outwardly-facing mirrored facets, wherein the second polygon is positioned relative to the first polygon along the central axis, and wherein the first and second polygons are rotatable about the central axis;
a first plurality of effective facets defined by portions of the first plurality of outwardly-facing mirrored facets that are overlapped by portions of the second plurality of outwardly-facing mirrored facets; and
a second plurality of effective facets defined by portions of the second plurality of outwardly-facing mirrored facets that are overlapped by portions of the first plurality of outwardly-facing mirrored facets, wherein the second plurality of effective facets are circumferentially interleaved with the first plurality of effective facets about the central axis, wherein the first and second polygons are configured to:
separate first reflected pulses of light from one another along a first plane, the first reflected pulses of light being reflected from one of the first plurality of effective facets as the first and second polygons rotate about the central axis; and
separate second reflected pulses of light from one another along a second plane, the second reflected pulses of light being reflected from one of the second plurality of effective facets as the first and second polygons rotate about the central axis, wherein the second plane is parallel to and separated from the first plane.

27. The multi-polygon as defined in claim 26, wherein the central axis is orthogonal to the first plane and to the second plane, and wherein the second plane is separated from the first plane.

* * * * *